US012347955B2

(12) United States Patent
Morita

(10) Patent No.: US 12,347,955 B2
(45) Date of Patent: Jul. 1, 2025

(54) CONNECTOR AND ELECTRONIC APPARATUS

(71) Applicant: KYOCERA CORPORATION, Kyoto (JP)

(72) Inventor: Shunsuke Morita, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 518 days.

(21) Appl. No.: 17/779,800

(22) PCT Filed: Nov. 26, 2020

(86) PCT No.: PCT/JP2020/044109
§ 371 (c)(1),
(2) Date: May 25, 2022

(87) PCT Pub. No.: WO2021/107052
PCT Pub. Date: Jun. 3, 2021

(65) Prior Publication Data

US 2023/0006384 A1 Jan. 5, 2023

(30) Foreign Application Priority Data

Nov. 27, 2019 (JP) ................................ 2019-214699

(51) Int. Cl.
*H01R 12/91* (2011.01)
*H01R 12/71* (2011.01)
*H01R 13/502* (2006.01)

(52) U.S. Cl.
CPC ........... *H01R 12/91* (2013.01); *H01R 12/716* (2013.01); *H01R 13/502* (2013.01)

(58) Field of Classification Search
CPC ........ H01R 12/00; H01R 12/70; H01R 12/71; H01R 12/712; H01R 12/716; H01R 12/91; H01R 13/502; H01R 13/5025; H01R 13/506; H01R 13/514
USPC .......................................................... 439/248
See application file for complete search history.

(56) References Cited

U.S. PATENT DOCUMENTS 9,160,122 B2 10/2015 Sato
9,627,822 B2 4/2017 Hori
9,799,971 B2 10/2017 Ninomiya
2017/0264032 A1 9/2017 Ninomiya et al.
(Continued)

FOREIGN PATENT DOCUMENTS

JP 5568677 B1 8/2014
JP 2016096152 A 5/2016
JP 2016207362 A 12/2016
(Continued)

*Primary Examiner* — Khiem M Nguyen
(74) *Attorney, Agent, or Firm* — Duane Morris LLP

(57) ABSTRACT

A connector (10) according to the present disclosure includes a fixed insulator (20), a movable insulator (30), and contacts (50). The fixed insulator (20) is in the shape of a frame. The movable insulator (30) is disposed inside the fixed insulator (20), and capable of moving relative to the fixed insulator (20). The movable insulator (30) mates with a connection object (60). The contacts (50) are attached to the fixed insulator (20) and the movable insulator (30). The movable insulator (30) includes a first movable insulator (30*a*), and a second movable insulator (30*b*). The first movable insulator (30*a*) and the second movable insulator (30*b*) are disposed inside the fixed insulator (20) while being separated from each other, and are capable of moving independently of each other.

12 Claims, 18 Drawing Sheets

(56) References Cited

U.S. PATENT DOCUMENTS

2017/0264051 A1 9/2017 Ninomiya et al.

FOREIGN PATENT DOCUMENTS

JP 2017162624 A 9/2017
JP 2018063886 A 4/2018

10

CONNECTOR AND ELECTRONIC APPARATUS

CROSS REFERENCES TO RELATED APPLICATIONS

The present application claims priority to Japanese Patent Application No. 2019-214699, filed Nov. 27, 2019, the entire disclosure of which is incorporated herein for reference.

TECHNICAL FIELD

The present disclosure relates to a connector, and an electronic apparatus.

BACKGROUND ART

Connectors with a floating structure are known in the art as an exemplary technique for improving the reliability of connection with a connection object, which is an object to be connected. The floating structure allows a part of such a connector to move even during and after mating to thereby absorb misalignment between the connection object and the connector.

PTL 1 discloses an electrical connector that contributes to miniaturization while preventing or reducing poor conduction caused by rising of flux.

Recent years have seen rapid diversification of modules in the field of electronics. Further, a growing need exists for multipolar connectors capable of collecting and connecting electrical signals generated in various modules.

CITATION LIST

Patent Literature

PTL 1: Japanese Patent No. 5568677

SUMMARY OF INVENTION

A connector according to an embodiment of the present disclosure includes:

a fixed insulator in a shape of a frame;

a movable insulator that is disposed inside the fixed insulator, capable of moving relative to the fixed insulator, and mates with a connection object, the connection object being an object to be connected; and a plurality of contacts attached to the fixed insulator and the movable insulator.

The movable insulator includes a first movable insulator and a second movable insulator that are disposed inside the fixed insulator while being separated from each other. The first movable insulator and the second movable insulator are capable of moving independently of each other.

An electronic apparatus according to an embodiment of the present disclosure includes the connector described above.

DESCRIPTION OF EMBODIMENTS

Figure 1:
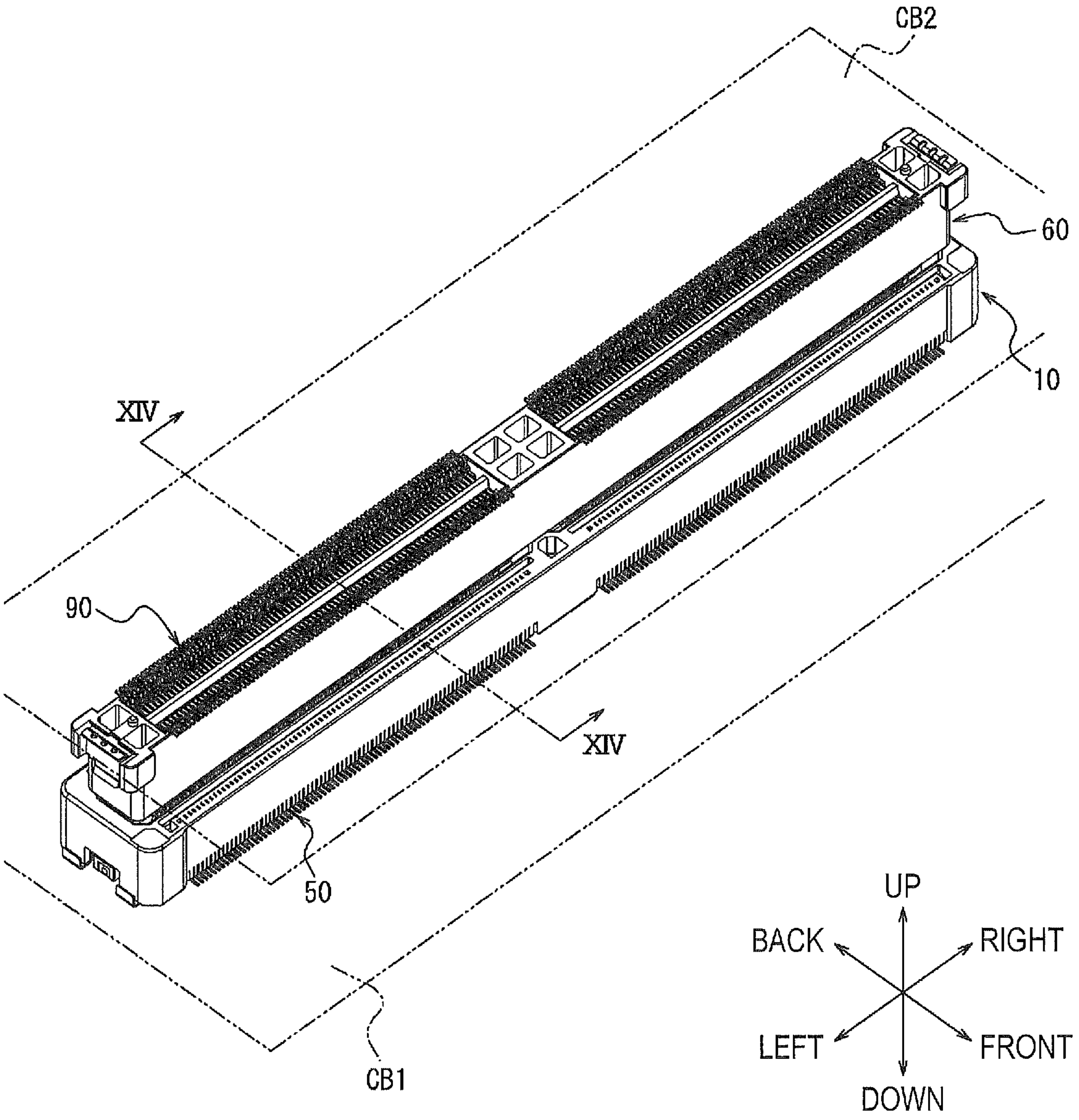
FIG. 1 is a top exterior perspective view of a connector according to an embodiment with a connection object connected to the connector.

For instance, if the connection object moves when the connection object and the connector are in their mated condition, a load such as stress is exerted on a movable insulator and a fixed insulator that are in mating engagement with the connection object. This makes these insulators susceptible to breakage, deformation, or other damage. Such load increases as, for example, the connector increases in length due to an increase in the number of poles. Accordingly, such a connector with a floating structure needs to be designed to mitigate this load. The design of the electrical connector described in PTL 1, however, does not give adequate consideration to a structure that allows for mitigation of the above-mentioned load.

A connector and an electronic apparatus according to an embodiment of the present disclosure make it possible to mitigate the load that is exerted on a movable insulator and a fixed insulator of the connector having a floating structure when these insulators are in mating engagement with the connection object.

An embodiment of the present disclosure will be described below in detail with reference to the accompanying drawings. As used herein, directional terms such as "front", "back", "left", "right", "upper", "lower", and "vertical" are used with reference to the directions indicated by arrows in the drawings. The directions indicated by arrows in FIGS. 1 to 11, FIG. 14, and FIGS. 17 to 19 are consistent between different figures. The directions indicated by arrows are consistent between FIGS. 12 and 13. The directions indicated by arrows are consistent between FIGS. 15 and 16. In some figures, circuit boards CB1 and CB2 described later are omitted for the simplicity of illustration.

Figure 2:
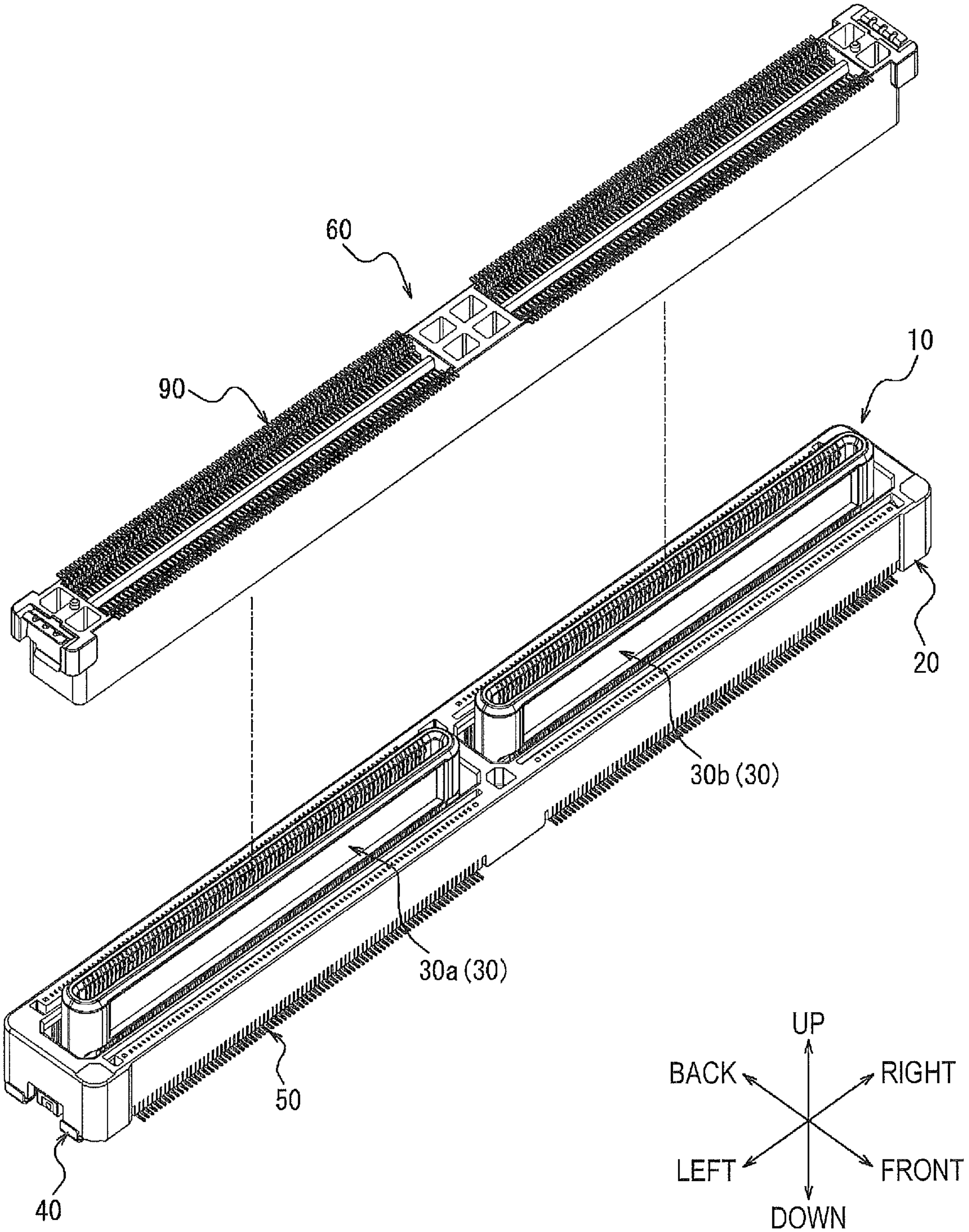
FIG. 2 is a top exterior perspective view of the connector according to the embodiment when separated from the connection object.

FIG. 1 is a top exterior perspective view of a connector 10 according to an embodiment with a connection object 60 connected to the connector 10. FIG. 2 is a top exterior perspective view of the connector 10 according to the embodiment when separated from the connection object 60. As illustrated in, for example, FIG. 2, the connector 10 includes a fixed insulator 20, a first movable insulator 30*a*, a second movable insulator 30*b*, a metal fitting 40, and contacts 50. In the following description, the first movable insulator 30*a* and the second movable insulator 30*b* will be collectively referred to as "movable insulator 30" or "movable insulators 30" when no distinction is made between these individual movable insulators.

Hereinafter, for example, the connector 10 according to the embodiment will be described as being a receptacle connector. The connection object 60 will be described as being a plug connector. With the connector 10 and the connection object 60 in their mated condition, the connector 10 whose contacts 50 undergo elastic deformation will be described as a receptacle connector, and the connection object 60 whose contacts 90 described later do not undergo elastic deformation will be described as a plug connector. The types of the connector 10 and the connection object 60 are not limited to those mentioned above. Alternatively, for example, the connector 10 may serve as a plug connector, and the connection object 60 may serve as a receptacle connector.

The connector 10 and the connection object 60 will be described below as being respectively mounted to a circuit board CB1 and a circuit board CB2. The connector 10 provides electrical connection between the connection object 60 mated with the connector 10, and the circuit board CB1. The connector 10 provides electrical connection between the circuit board CB2 on which the connection object 60 is mounted, and the circuit board CB1. The circuit boards CB1 and CB2 may be rigid boards or any other circuit boards. For example, at least one of the circuit board CB1 and the circuit board CB2 may be a flexible printed circuit board (FPC).

The connector 10 and the connection object 60 will be described below as being connected to each other in a direction perpendicular to the circuit boards CB1 and CB2. In one example, the connector 10 and the connection object 60 are connected to each other in the up-down direction. However, the connector 10 and the connection object 60 may not necessarily be connected as described above. In one alternative example, the connector 10 and the connection object 60 may be connected to each other in a direction parallel to the circuit boards CB1 and CB2. In another alternative example, the connector 10 and the connection object 60 may be connected to each other such that one of the connector 10 and the connection object 60 is perpendicular to the circuit board on which the one of the connector 10 and the connection object 60 is mounted, and the other one of the connector 10 and the connection object 60 is parallel to the circuit board on which the other one of the connector 10 and the connection object 60 is mounted.

As used herein, the term "mating direction" means, for example, the up-down or vertical direction. The term "mating side" refers to, for example, the upper side. The term "protruding direction" refers to, for example, the left-right direction. The term "direction of arrangement of the contacts 50" refers to, for example, the left-right direction.

The connector 10 according to an embodiment has a floating structure. The connector 10 allows the connection object 60 connected with the connector 10 to move relative to the circuit board CB1. The connection object 60 is capable of moving within a predetermined range relative to the circuit board CB1 even when the connection object 60 is being connected with the connector 10.

Figure 3:
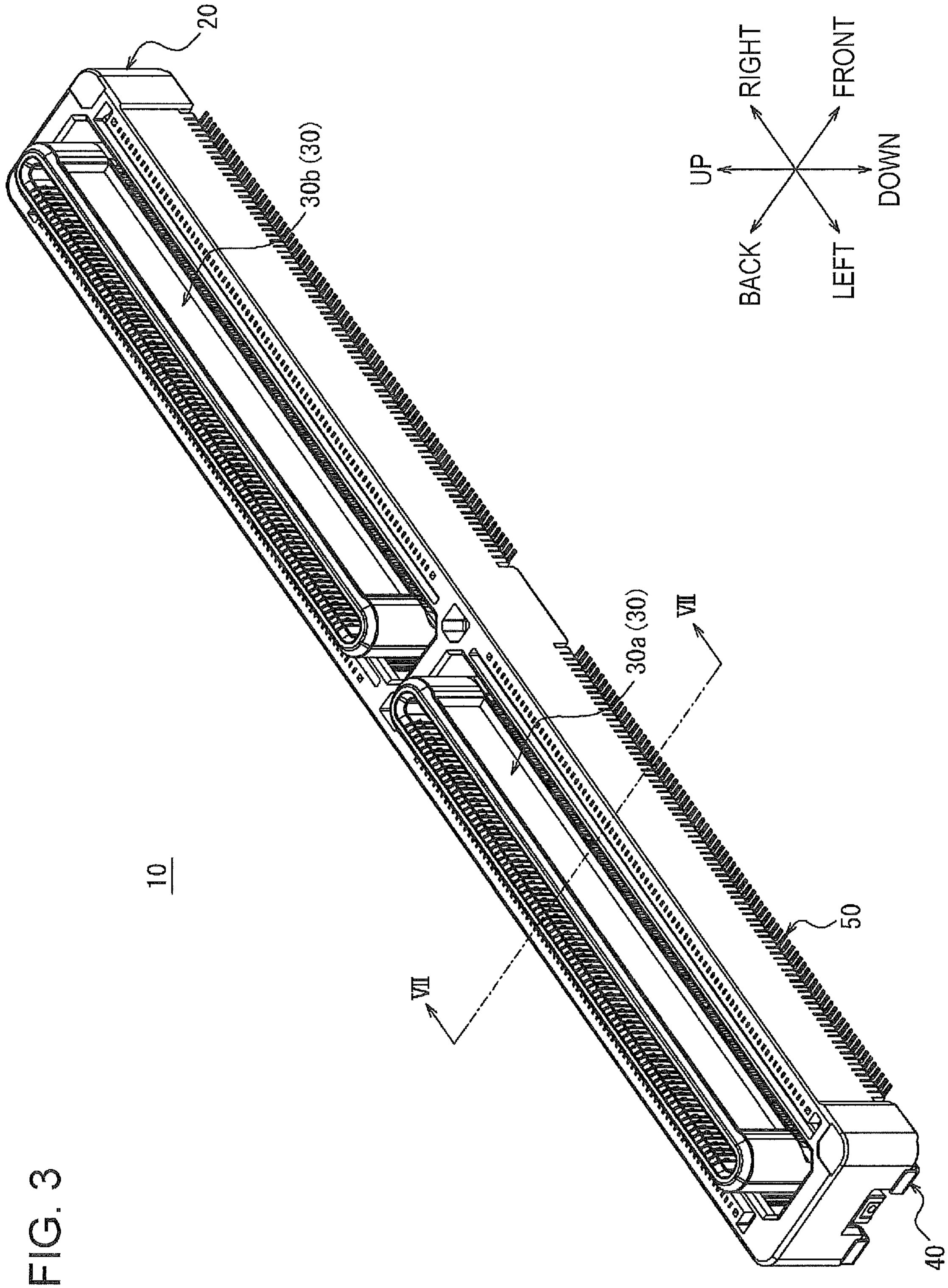
FIG. 3 is a top exterior perspective view of the connector illustrated in in FIG. 1 with the connector shown alone.
Figure 4:
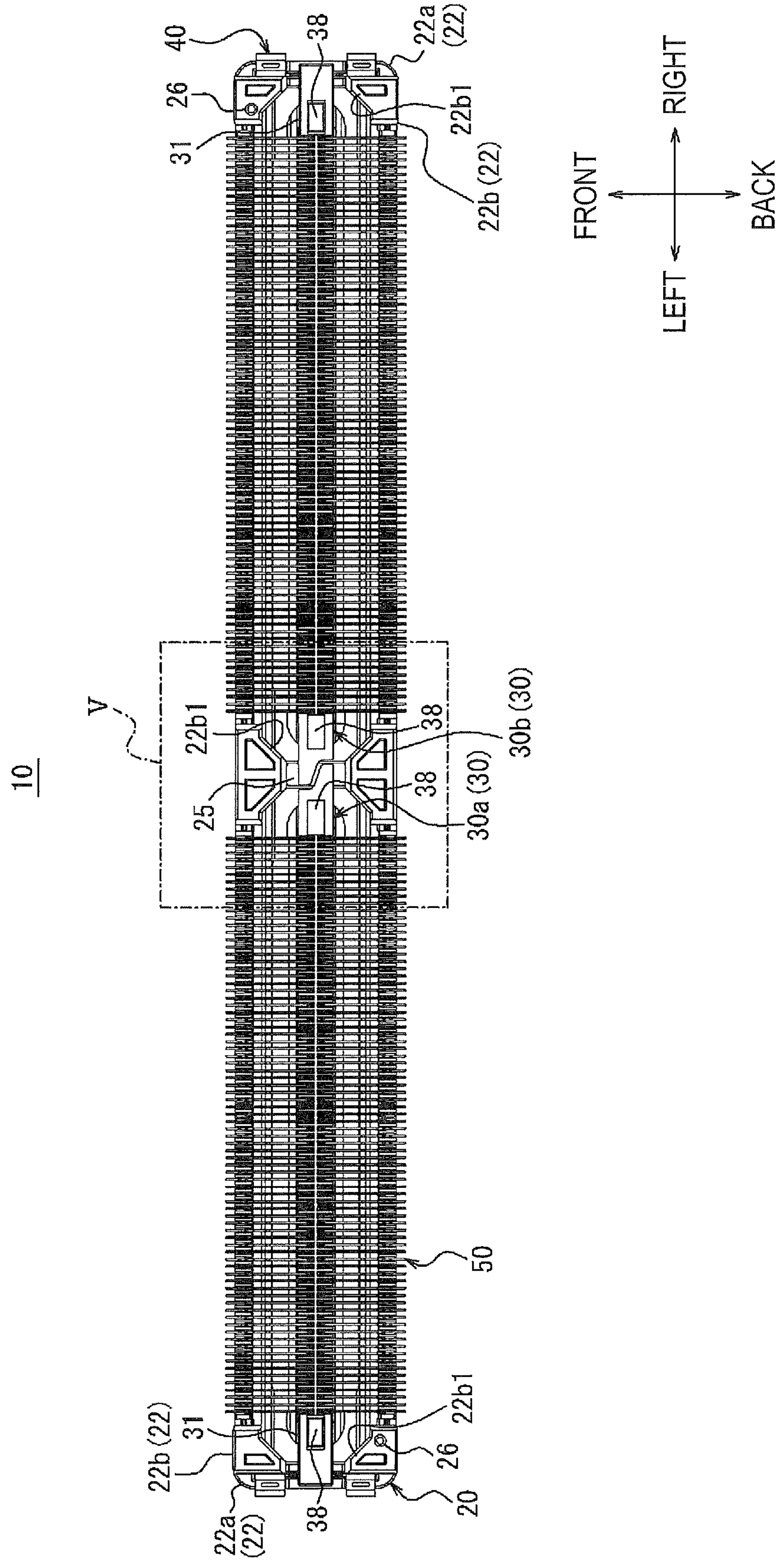
FIG. 4 is a bottom view of the connector illustrated in FIG. 1 with the connector shown alone.
Figure 5:
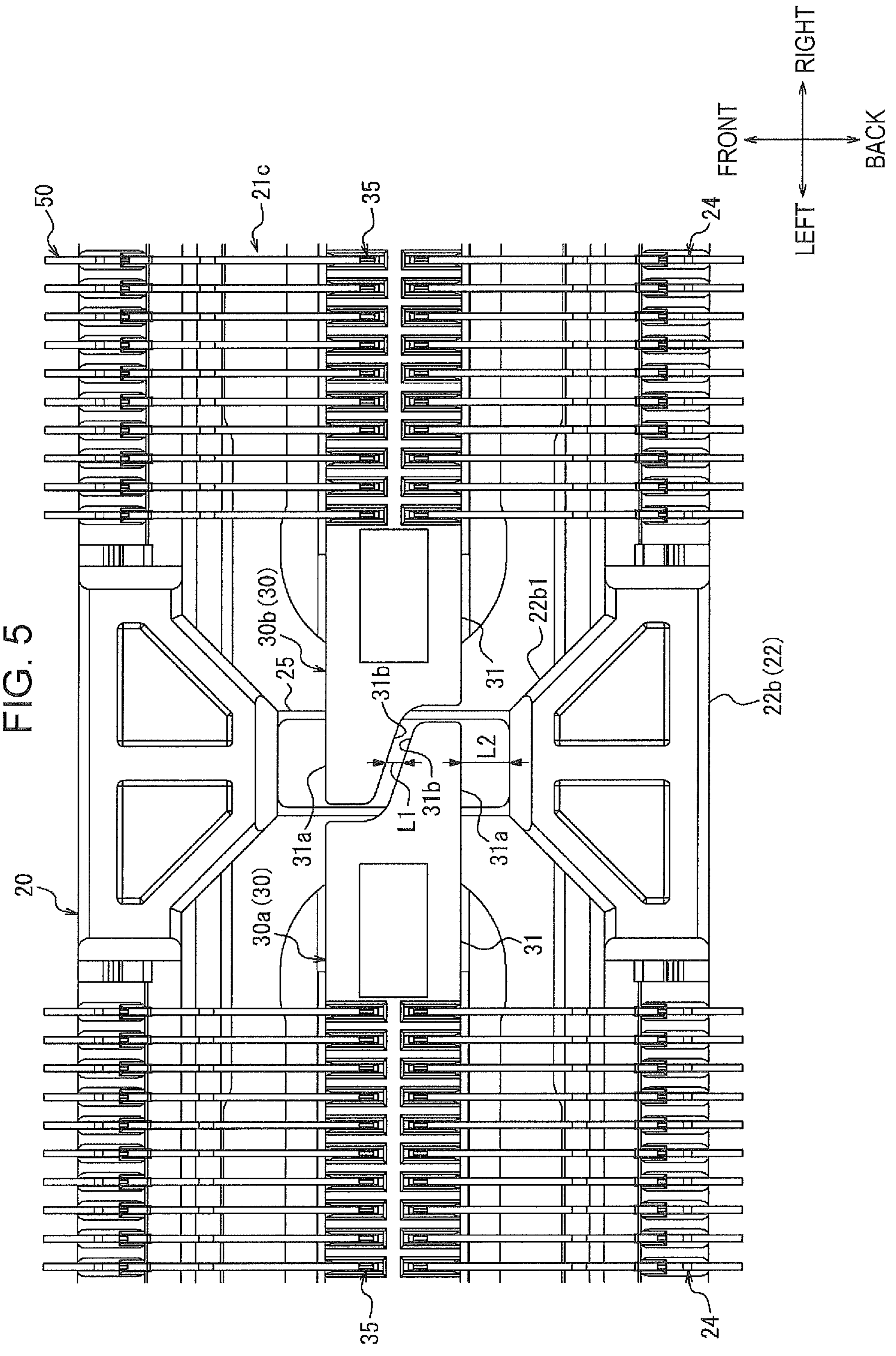
FIG. 5 is an enlarged view of a portion V bounded by dashed lines illustrated in FIG. 4.
Figure 6:
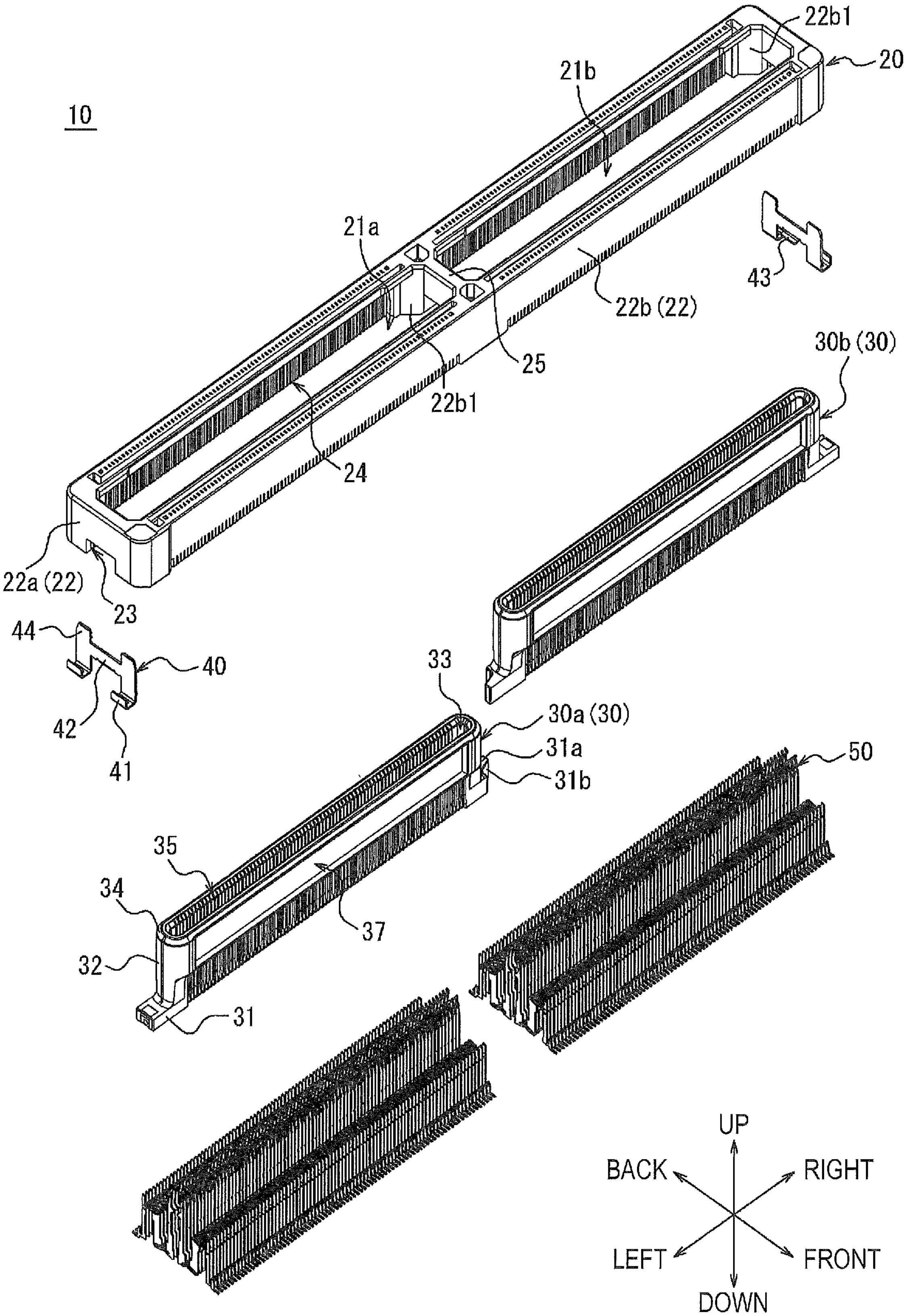
FIG. 6 is a top exploded perspective view of the connector illustrated in FIG. 3.
Figure 7:
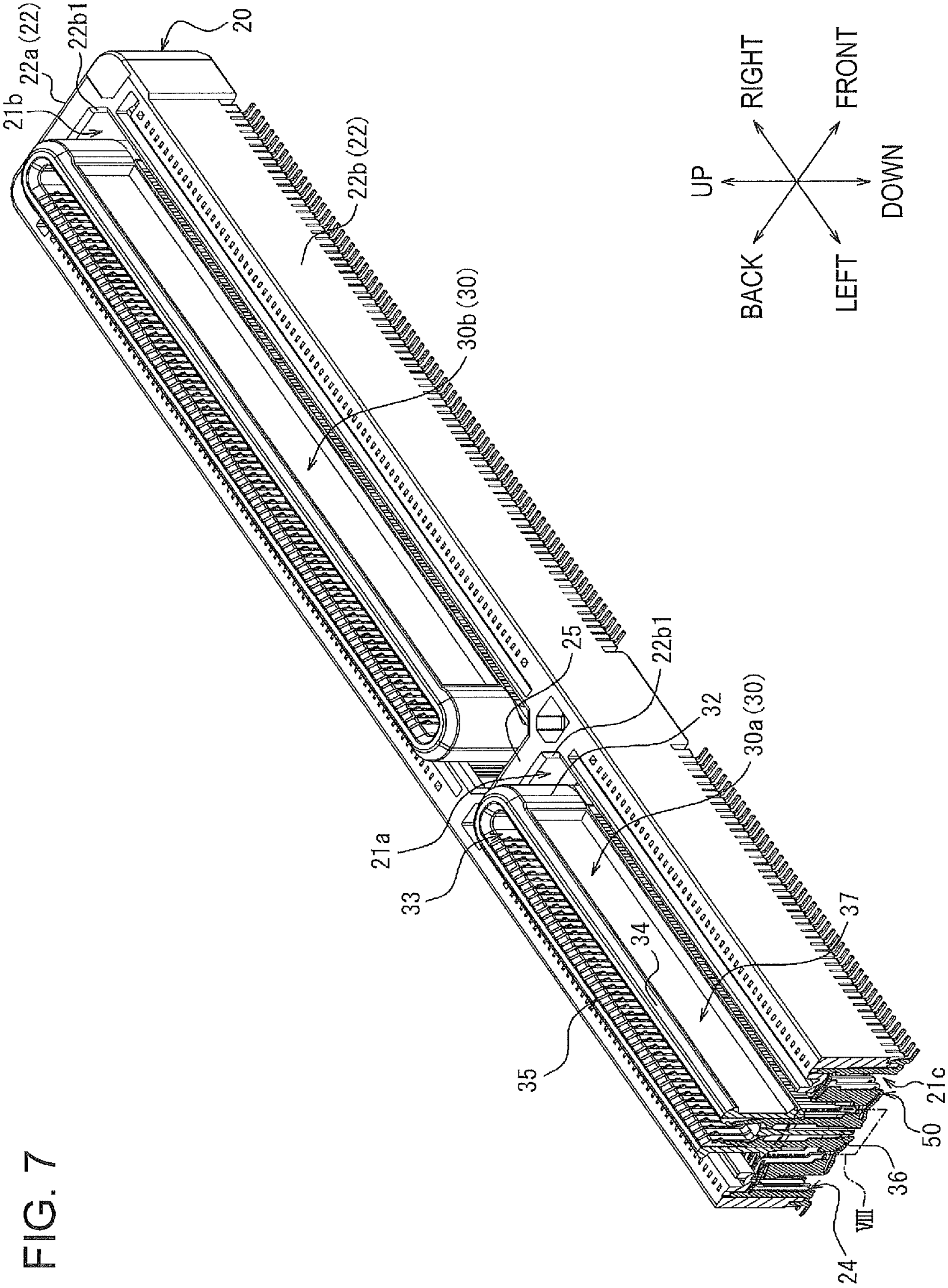
FIG. 7 is a cross-sectional perspective view taken along an arrow line VII-VII illustrated in FIG. 3.
Figure 8:
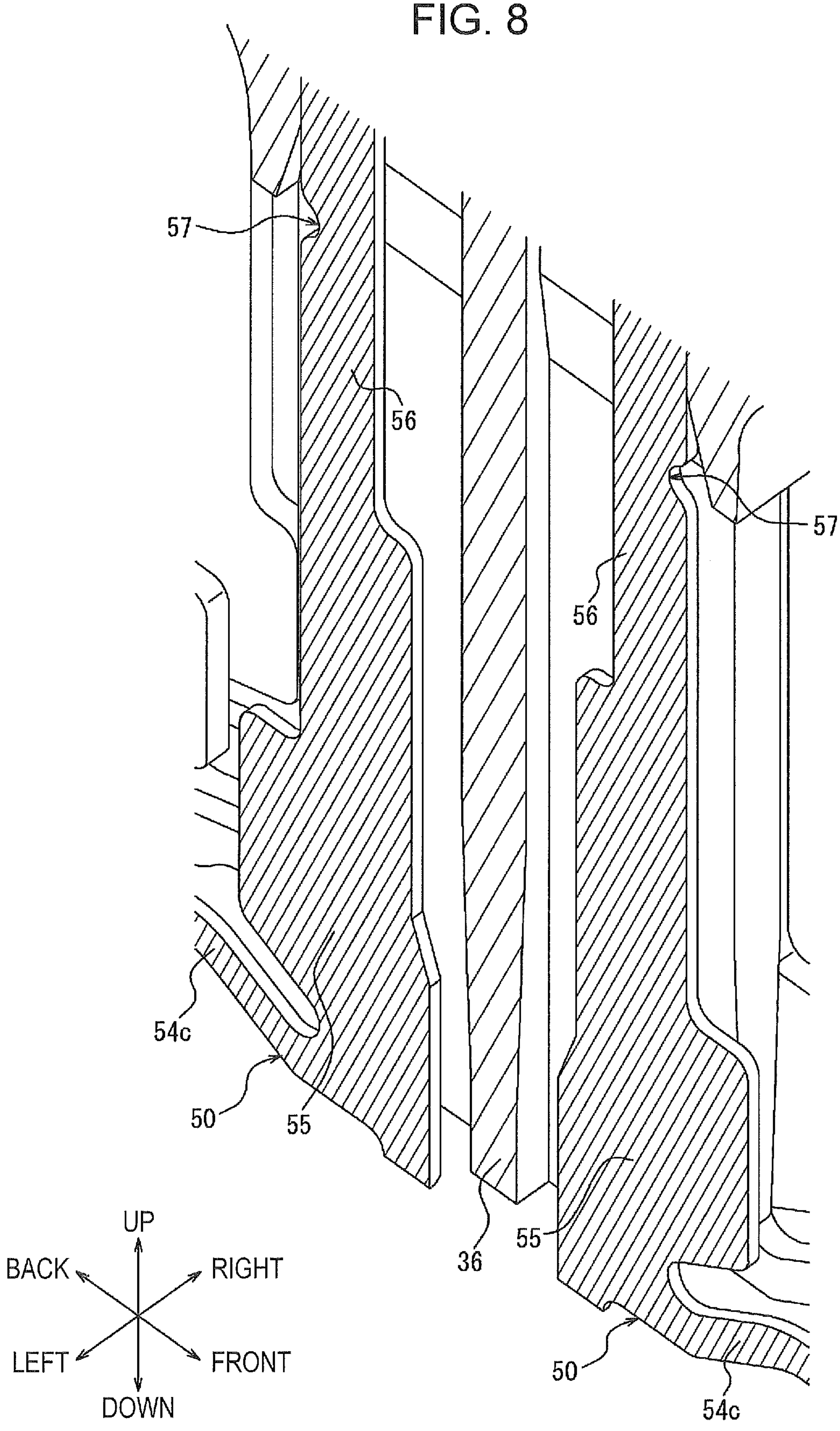
FIG. 8 is an enlarged view of a portion VIII bounded by dashed lines illustrated in FIG. 7.
Figure 9:
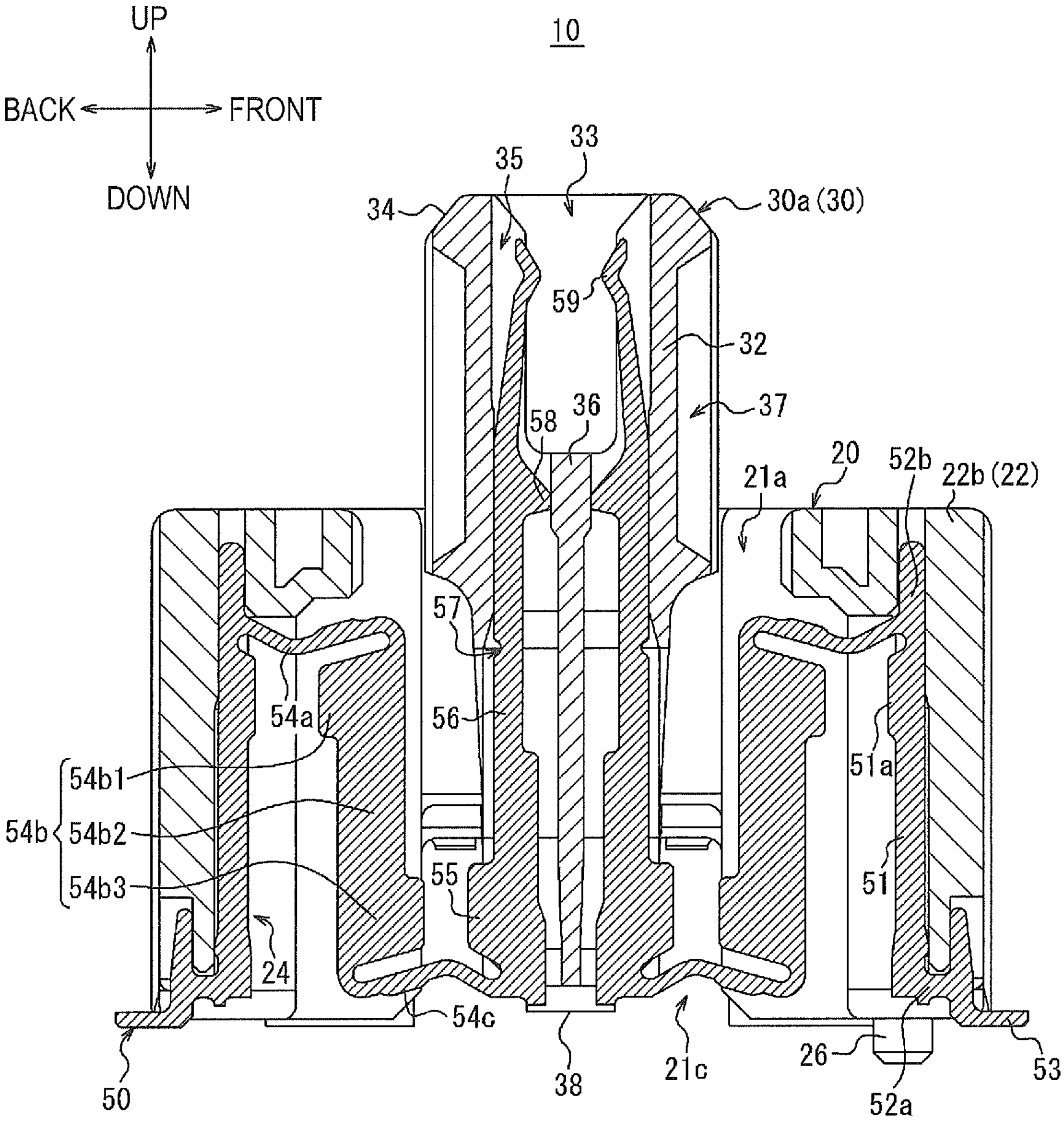
FIG. 9 is a cross-sectional view taken along the arrow line VII-VII illustrated in FIG. 3.
Figure 10:
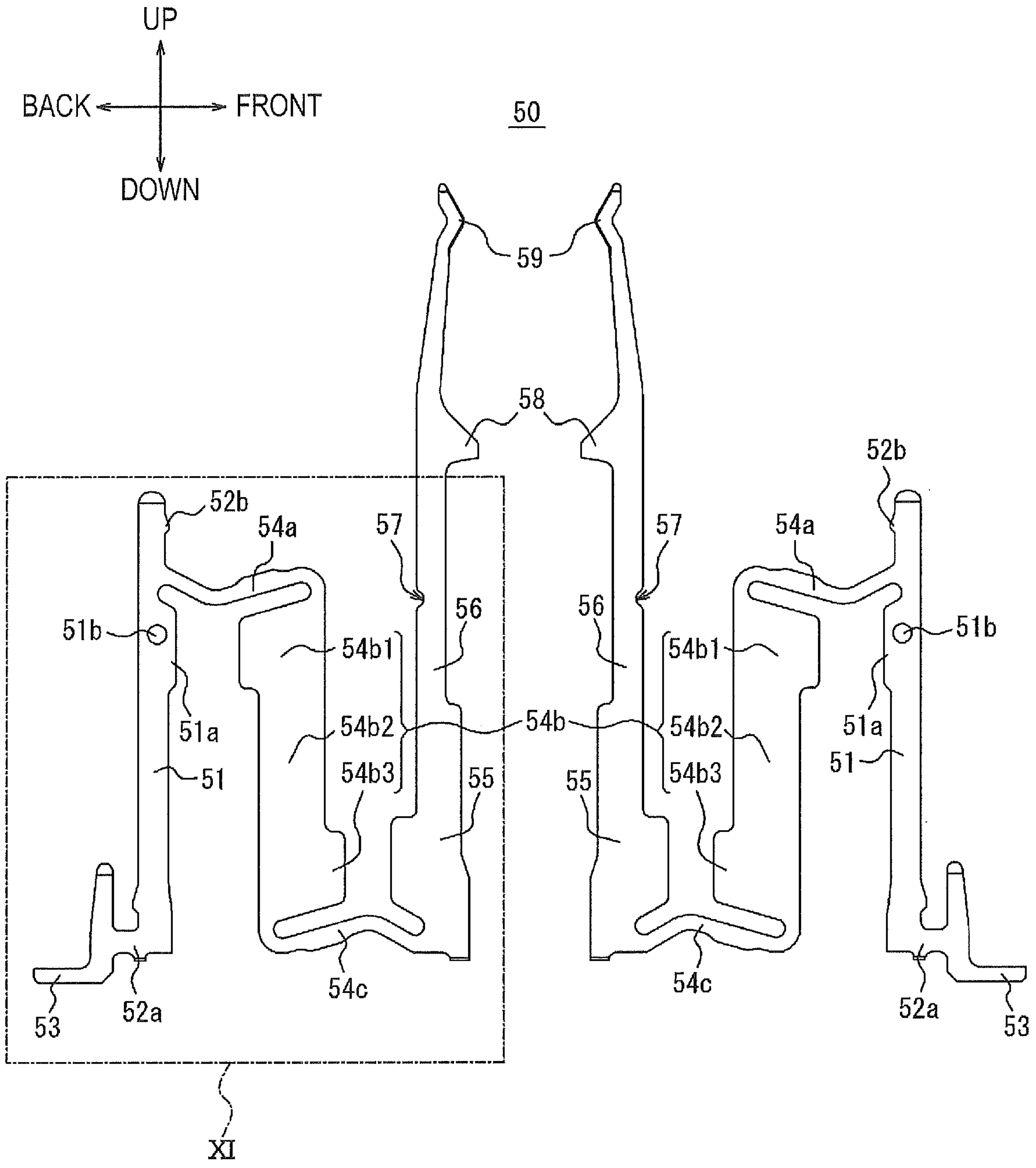
FIG. 10 is a front view of a pair of contacts illustrated in FIG. 6.
Figure 11:
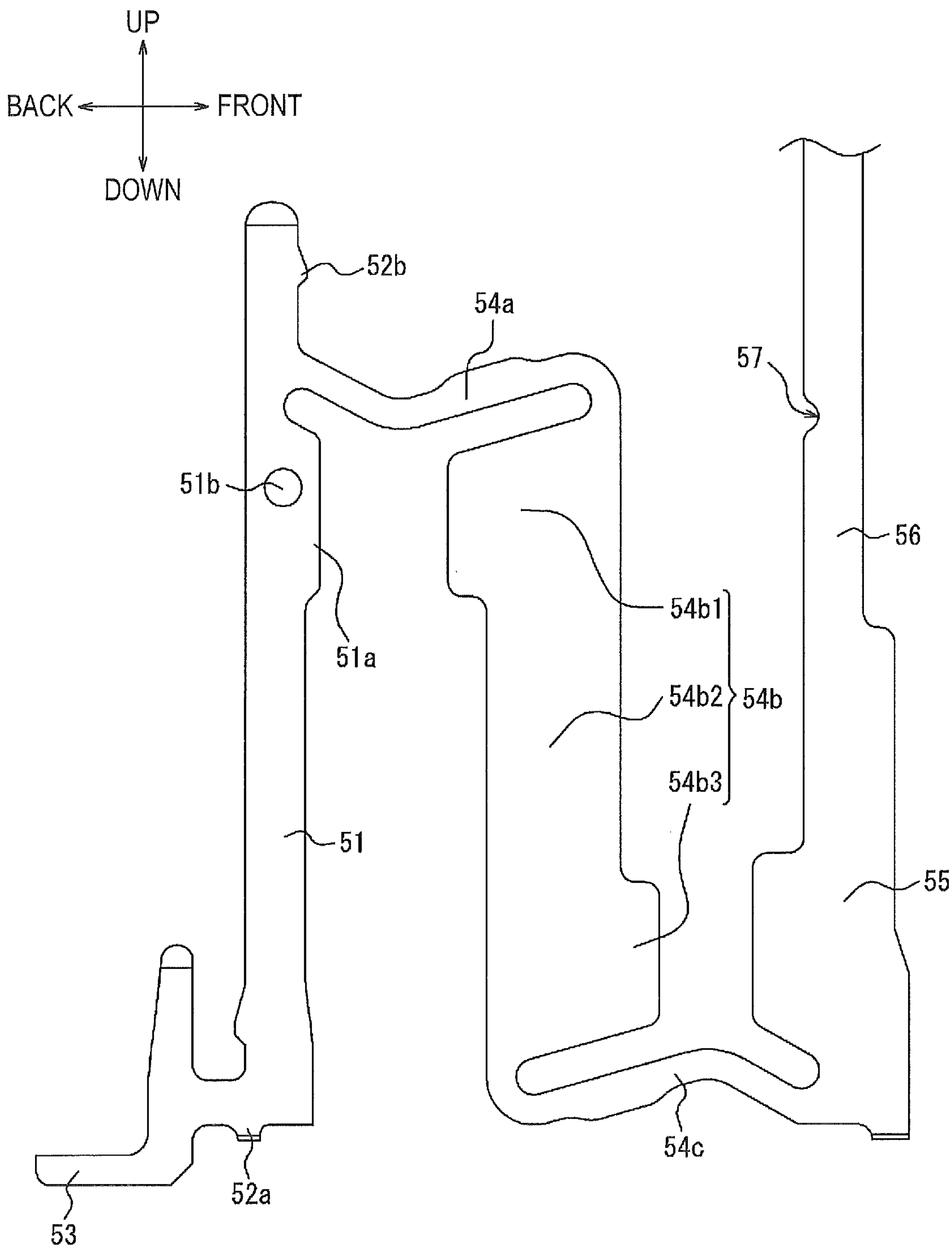
FIG. 11 is an enlarged view of a portion XI bounded by dashed lines illustrated in FIG. 10.

FIG. 3 is a top exterior perspective view of the connector 10 illustrated in in FIG. 1 with the connector 10 shown alone. FIG. 4 is a bottom view of the connector 10 illustrated in FIG. 1 with the connector 10 shown alone. FIG. 5 is an enlarged view of a portion V bounded by dashed lines illustrated in FIG. 4. FIG. 6 is a top exploded perspective view of the connector 10 illustrated in FIG. 3. FIG. 7 is a cross-sectional perspective view taken along an arrow line VII-VII illustrated in FIG. 3. FIG. 8 is an enlarged view of a portion VIII bounded by dashed lines illustrated in FIG. 7. FIG. 9 is a cross-sectional view taken along the arrow line VII-VII illustrated in FIG. 3. FIG. 10 is a front view of a pair of contacts 50 illustrated in FIG. 6. FIG. 11 is an enlarged view of a portion XI bounded by dashed lines illustrated in FIG. 10. Although the arrow line VII-VII is depicted in FIG. 3 as being positioned over, for example, the first movable insulator 30*a* of the movable insulator 30, the same cross-sections as those illustrated in FIGS. 7 to 9 are obtained also for the second movable insulator 30*b*. Accordingly, the description given below with respect to the first movable insulator 30*a* similarly applies to the second movable insulator 30*b*.

As illustrated in FIG. 6, in one example, the connector 10 is assembled as described below. The metal fitting 40 is press-fit into the fixed insulator 20 from below, and the movable insulator 30 is disposed inside the fixed insulator 20 into which the metal fitting 40 has been press-fit. Each contact 50 is press-fit into the fixed insulator 20 and the movable insulator 30 from below.

Reference is made below mainly to the configurations of individual components of the connector 10 when the contact 50 is not being elastically deformed. The configuration of the fixed insulator 20 is mainly described below with reference to FIGS. 3 to 9.

As illustrated in FIGS. 6 and 7, the fixed insulator 20 is a rectangular tubular component that is injection molded from a synthetic resin material having insulating and heat-resistant properties. The fixed insulator 20 is in the shape of a hollow frame. The fixed insulator 20 has, on the top side, a first opening 21*a* and a second opening 21*b*. The fixed insulator 20 has a third opening 21*c* on the bottom side. The fixed insulator 20 has an outer periphery wall 22. The outer periphery wall 22 includes four side walls on the front, back, left, and right sides, and surrounds the space inside the fixed insulator 20. More specifically, the outer periphery wall 22 includes a pair of lateral walls 22*a* on the left and right sides, and a pair of longitudinal walls 22*b* on the front and back sides. Each longitudinal wall 22*b* has a protruding wall 22*b*1 provided at the left and right ends and in the middle of the longitudinal wall 22*b*. The protruding wall 22*b*1 protrudes inward in the front-back direction.

The fixed insulator 20 has a metal-fitting attachment groove 23. The metal-fitting attachment groove 23 is defined in the lateral wall 22*a* so as to extend vertically, and provided inside the fixed insulator 20. The metal fitting 40 is attached to the metal-fitting attachment groove 23.

The fixed insulator 20 has multiple contact attachment grooves 24 defined on the inner side of the longitudinal wall 22*b* such that the contact attachment grooves 24 extend from the lower edge to the bottom and inner surfaces. The contact attachment grooves 24 are spaced from each other at predetermined intervals in the left-right direction. Each contact attachment groove 24 extends vertically on the longitudinal wall 22*b* of the fixed insulator 20. The contact 50 is attached to the contact attachment groove 24.

The fixed insulator 20 has a division wall 25 in the middle part of the longitudinal wall 22*b*. The division wall 25 extends in the front-back direction so as to couple the longitudinal wall 22*b* on the front side and the longitudinal wall 22*b* on the back side to each other. The division wall 25 divides, in the middle part of the longitudinal wall 22*b*, the first opening 21*a* and the second opening 21*b* from each other. The division wall 25 is provided inside the fixed insulator 20 so as to extend vertically from the top surface of the fixed insulator 20 to the vertically middle part of the fixed insulator 20. As illustrated in FIG. 4, the fixed insulator 20 has a pair of bosses 26. One of the bosses 26 protrudes from the bottom surface at the left end of the longitudinal wall 22*b* on the back side of the fixed insulator 20. The other boss 26 protrudes from the bottom surface at the right end of the longitudinal wall 22*b* on the front side of the fixed insulator 20.

Reference is now made mainly to FIGS. 4 to 9 to describe the configuration of the movable insulator 30.

The movable insulator 30 is disposed inside the fixed insulator 20, and capable of moving relative to the fixed insulator 20. The movable insulator 30 mates with the connection object 60. The movable insulator 30 includes the first movable insulator 30*a*, and the second movable insulator 30*b*. The first movable insulator 30*a* and the second movable insulator 30*b* are disposed inside the fixed insulator 20 while being separated from each other, and are capable of moving independently of each other.

For example, the connector 10 is designed such that the first movable insulator 30*a* and the second movable insulator 30*b* are identical to each other in shape. For example, the first movable insulator 30*a* and the second movable insulator 30*b* are disposed linearly in the direction of arrangement of the contacts 50 in an inverted relationship relative to each other. For example, the first movable insulator 30*a* is disposed in the left side of the movable insulator 30. The second movable insulator 30*b* is disposed in the right side of the movable insulator 30.

Now, with attention directed to only the first movable insulator 30*a* disposed on the left side in the direction of arrangement of the contacts 50, the configuration of the first movable insulator 30*a* is mainly described below. The description given below with respect to the first movable insulator 30*a* similarly applies to the second movable insulator 30*b*.

As illustrated in FIGS. 6 to 8, the first movable insulator 30*a* is a component extending in the left-right direction and injection molded from a synthetic resin material having insulating and heat-resistant properties. The first movable insulator 30*a* is in the form of a step-shaped projection in front elevation view. The first movable insulator 30*a* has a bottom portion 31, and a mating projection 32. The bottom portion 31 defines a lower part of the first movable insulator 30*a*. The mating projection 32 projects upward from the bottom portion 31, and mates with the connection object 60. The bottom portion 31 is longer than the mating projection 32 in the left-right direction. The bottom portion 31 has a protrusion 31*a*, which protrudes toward the second movable insulator 30*b* from a side of the bottom portion 31 near the second movable insulator 30*b*, that is, from the right side of the bottom portion 31. The protrusion 31*a* has an opposing surface 31*b* inclined obliquely with respect to the left-right direction.

The first movable insulator 30*a* has a mating recess 33 defined at the top of the mating projection 32. The first movable insulator 30*a* has a guide portion 34 provided along the entire upper edge of the mating projection 32 so as to surround the mating recess 33. The guide portion 34 is an inclined surface defined at the upper edge of the mating projection 32 and inclined obliquely inward in the upward direction.

The first movable insulator 30*a* has multiple contact attachment grooves 35 that are spaced from each other at predetermined intervals in the left-right direction. Each contact attachment groove 35 extends vertically across the first movable insulator 30*a*. The lower part of the contact attachment groove 35 is formed by recessing the respective lower parts of the front and back surfaces of the first movable insulator 30*a*. The middle part of the contact attachment groove 35 is located inside the first movable insulator 30*a*. The upper part of the contact attachment groove 35 is formed by recessing the respective inner surfaces of the front and back sides of the mating recess 33. The contact 50 is attached to the contact attachment groove 35.

The first movable insulator 30*a* has a wall 36 that extends inside the first movable insulator 30*a* downward from the bottom surface of the mating recess 33. The wall 36 is located between a pair of contacts 50 attached to the first movable insulator 30*a* with the contacts 50 being arranged in the front-back direction. The wall 36 faces the pair of contacts 50. The wall 36 is widest in its upper part. The wall 36 is narrower in the middle part than in the upper part. The wall 36 is even narrower in the lower part than in the middle part. The front and back surfaces of the wall 36 define a part of the contact attachment groove 35. The middle part of the contact attachment groove 35 defined inside the first movable insulator 30*a* has a width that, in accordance with changes in width in the middle and upper parts of the wall 36, decreases in the front-back direction from the lower portion toward the upper portion.

The first movable insulator 30*a* has a recess 37 defined in an upper part of the mating projection 32 so as to extend across substantially the entire upper part in the left-right direction. The recess 37 is defined on the front and back sides in the upper part of the mating projection 32. As illustrated in FIG. 4, the first movable insulator 30*a* has a pair of projections 38. The projections 38 project downward from the lower surface at the left and right ends of the bottom portion 31.

As illustrated in FIG. 5, the protrusion 31*a* (first protrusion) of the first movable insulator 30*a* protrudes toward the second movable insulator 30*b* from a side of the first movable insulator 30*a* near the second movable insulator 30*b*. The protrusion 31*a* (second protrusion) of the second movable insulator 30*b* is spaced apart from the protrusion 31*a* of the first movable insulator 30*a*, and protrudes toward the first movable insulator 30*a* from a side of the second movable insulator 30*b* near the first movable insulator 30*a*.

The distal end of the protrusion 31*a* of the first movable insulator 30*a* is positioned further toward the second movable insulator 30*b* relative to the distal end of the protrusion 31*a* of the second movable insulator 30*b*. In other words, the protrusion 31*a* of the first movable insulator 30*a*, and the protrusion 31*a* of the second movable insulator 30*b* at least partially overlap each other in the protruding direction. For example, the opposing surface 31*b* of the first protrusion, and the opposing surface 31*b* of the second protrusion face each other in the front-back direction. The two opposing surfaces 31*b* are positioned substantially parallel to each other with the opposing surfaces 31*b* being inclined obliquely with respect to the left-right direction. A separation L1, which is the distance between the two opposing surfaces 31*b* in the front-back direction, is smaller than a separation L2, which is the distance between the protrusion 31*a* and the protruding wall 22*b*1 of the fixed insulator 20.

The division wall 25 of the fixed insulator 20 overlaps the first protrusion and the second protrusion from the mating side from which the connection object 60 is mated to the movable insulator 30. More specifically, the division wall 25 of the fixed insulator 20 overlaps, from above, the location where the first protrusion and the second protrusion overlap each other in the protruding direction.

Reference is now made mainly to FIG. 6 to describe the configuration of the metal fitting 40.

The metal fitting 40 is obtained by forming a thin plate made of any desired metallic material into the shape illustrated in FIG. 6 by use of a progressive die (stamping). The metal fitting 40 is formed by a process including blanking followed by bending in the direction of plate thickness. The metal fitting 40 is press-fit into the metal-fitting attachment groove 23 of the fixed insulator 20, and disposed at the left and right ends of the fixed insulator 20. The metal fitting 40 has an H-shape when viewed in elevation in the left-right direction.

The metal fitting 40 has a mounting portion 41 provided at the lower end on the front and back sides of the metal fitting 40 and extending outward in a U-shape. The metal fitting 40 has a coupling portion 42 in the vertically middle part of the metal fitting 40. The coupling portion 42 extends in the front-back direction. The metal fitting 40 has a retaining portion 43 in the coupling portion 42. The retaining portion 43 protrudes inward in the left-right direction from the lower edge of the middle part of the coupling portion 42 in the front-back direction. The retaining portion 43 prevents or reduces upward disengagement of the movable insulator 30 from the fixed insulator 20. The metal fitting 40 has a locking portion 44 at the front and back upper ends of the metal fitting 40. The locking portion 44 is capable of locking engagement with the metal-fitting attachment groove 23 of the fixed insulator 20.

Reference is now made mainly to FIGS. 9 to 11 to describe the configuration of the contact 50.

The contact 50 is obtained by, for example, forming a thin plate made of a copper alloy having spring elasticity, such as phosphor bronze, beryllium copper, or titanium copper, or a Corson copper alloy into the shape illustrated in FIGS. 9 to 11 by use of a progressive die (stamping). The contact 50 is formed by blanking alone. However, this is not intended to limit the method for forming the contact 50. Alternatively, the contact 50 may be formed by a process including blanking followed by bending in the direction of plate thickness. The contact 50 is made of, for example, a metallic material with a small elastic modulus so that the contact 50 undergoes a large change in shape when subjected to elastic deformation. The surface of the contact 50 is applied with an undercoat of nickel plating, and then plated with gold, tin, or other metal.

As illustrated in FIG. 6, multiple contacts 50 are arranged in the left-right direction. As illustrated in FIG. 9, each contact 50 is attached to the fixed insulator 20 and the movable insulator 30. As illustrated in FIGS. 9 and 10, a pair of contacts 50 arranged at the same position in the left-right direction are formed and positioned symmetri in the front-back direction. The pair of contacts 50 are formed and arranged so as to be line symmetric to each other with respect to a vertical axis passing through the center of the space between the contacts 50.

The contact 50 has a base 51. The base 51 extends vertically, and is supported by the fixed insulator 20. The contact 50 has a first locking portion 52*a*. The first locking portion 52*a* is contiguous with the lower end of the base 51, and capable of locking engagement with the contact attachment groove 24 of the fixed insulator 20. The contact 50 has a second locking portion 52*b*. The second locking portion 52*b* is contiguous with the upper end of the base 51, and capable of locking engagement with the contact attachment groove 24 of the fixed insulator 20. The second locking portion 52*b* is located closer to the mating side than is a first wide portion 51*a* described later. The base 51, the first locking portion 52*a*, and the second locking portion 52*b* are received in the contact attachment groove 24 of the fixed insulator 20. The contact 50 has a mounting portion 53. The mounting portion 53 extends outward in an L-shape from the outer side of the lower end of the first locking portion 52*a*.

The contact 50 has the first wide portion 51*a* defining a part of the base 51 and located in the fixed insulator 20. The first wide portion 51*a* is located inside the fixed insulator 20 and along the inner surface of the longitudinal wall 22*b*. The first wide portion 51*a* is not in direct locking engagement with the fixed insulator 20 but is supported in place by means of locking engagement of the first locking portion 52*a* and the second locking portion 52*b* with the fixed insulator 20. The first wide portion 51*a* is contiguous with a first elastic portion 54*a* described later. The first wide portion 51*a* is provided near the outer end of the first elastic portion 54*a* such that the first wide portion 51*a* is adjacent to the first elastic portion 54*a*.

The first wide portion 51*a* protrudes further toward the movable insulator 30 in the front-back direction, relative to other parts of the contact 50 that extend along the fixed insulator 20. The first wide portion 51*a* protrudes one step further inward in the front-back direction relative to other parts of the base 51. The first wide portion 51*a* is wider in the front-back direction than are other parts of the base 51. Likewise, the first wide portion 51*a* is wider than the first elastic portion 54*a*. The first wide portion 51*a* is thus generally larger in cross-sectional area than other parts of the base 51 and than the first elastic portion 54*a*. Consequently, the first wide portion 51*a* has a higher electrical conductivity than other parts of the base 51 and than the first elastic portion 54*a*. More specifically, the first wide portion 51*a* has a lower characteristic impedance than other parts of the base 51 and than the first elastic portion 54*a*.

As illustrated in FIGS. 10 and 11, the contact 50 has a projecting and recessed portion 51*b* on the surface of the first wide portion 51*a*. The projecting and recessed portion 51*b* defines a projection on one outer surface of the contact 50 in the left-right direction. Conversely, the projecting and recessed portion 51*b* defines a recess on the other outer surface of the contact 50 in the left-right direction. With the contact 50 attached on the fixed insulator 20, the projecting and recessed portion 51*b* is in contact with the surface of the contact attachment groove 24. This configuration prevents or reduces torsion applied in the left-right direction to the contact 50, which is formed with a narrow width in the left-right direction by blanking. The above-mentioned configuration thus allows the contact 50 to be securely attached to the fixed insulator 20 even if the contact 50 has a narrow width in the left-right direction. Further, even if the movable insulator 30 moves relative to the fixed insulator 20 when the connector 10 and the connection object 60 are in their mated condition, the above-mentioned configuration prevents or reduces torsion applied to the contact 50 in the left-right direction.

The contact 50 has the first elastic portion 54*a* capable of elastic deformation and extending inward in the front-back direction from the base 51. The first elastic portion 54*a* extends from the base 51 inward in an obliquely downward direction, and then bends obliquely upward and continues to extend linearly in that direction. The first elastic portion 54*a* bends again downward at its inner end, and connects to the upper end of an intermediate portion 54*b* described later. The first elastic portion 54*a* is narrower than the base 51 and the first wide portion 51*a*. The above-mentioned configuration makes it possible to adjust which part of the first elastic portion 54*a* is to undergo elastic displacement.

The contact 50 has the intermediate portion 54*b* contiguous with the first elastic portion 54*a*. The intermediate portion 54*b* generally has a greater width, that is, a larger cross-sectional area than the first elastic portion 54*a*. Consequently, the intermediate portion 54*b* has a higher electrical conductivity than the first elastic portion 54*a*. The intermediate portion 54*b* extends in the mating direction when the contact 50 is not under elastic deformation.

The intermediate portion 54*b* has a first adjustment portion 54*b*1, a second adjustment portion 54*b*2, and a third adjustment portion 54*b*3. The first adjustment portion 54*b*1 defines an upper part of the intermediate portion 54*b*. The second adjustment portion 54*b*2 defines a middle part of the intermediate portion 54*b*. The third adjustment portion 54*b*3 defines a lower part of the intermediate portion 54*b*. The first adjustment portion 54*b*1 is connected at the upper end to the first elastic portion 54*a*. The first adjustment portion 54*b*1 has a larger cross-sectional area than the first elastic portion 54*a*. The first adjustment portion 54*b*1 protrudes one step further outward in the front-back direction relative to the second adjustment portion 54*b*2. The second adjustment portion 54*b*2 is smaller in cross-sectional area than the first adjustment portion 54*b*1, and larger in cross-sectional area than the first elastic portion 54*a*. For example, the second adjustment portion 54*b*2 is narrower than the first adjustment portion 54*b*1 in the front-back direction, and wider than the first elastic portion 54*a* in the front-back direction. The third adjustment portion 54*b*3 is larger in cross-sectional area than the second adjustment portion 54*b*2. The third adjustment portion 54*b*3 protrudes one step further inward in the front-back direction relative to the second adjustment portion 54*b*2. The intermediate portion 54*b* thus has a comparatively high electrical conductivity in the first adjustment portion 54*b*1 and the third adjustment portion 54*b*3, and has a lower electrical conductivity in the second adjustment portion 54*b*2 than in the first adjustment portion 54*b*1 and the third adjustment portion 54*b*3. The first adjustment portion 54*b*1 and the third adjustment portion 54*b*3 are symmetric to each other. More specifically, the first adjustment portion 54*b*1 and the third adjustment portion 54*b*3 are point-symmetric to each other with respect to the center of the intermediate portion 54*b*.

The contact 50 has a second elastic portion 54*c*. The second elastic portion 54*c* is capable of elastic deformation, and extends from the lower end of the third adjustment portion 54*b*3 to the movable insulator 30. The second elastic portion 54*c* bends obliquely upward from the lower end of the third adjustment portion 54*b*3, and continues to extend linearly in that direction. The second elastic portion 54*c* then bends again obliquely downward, and connects to the outer end of a second wide portion 55 described later. As with the first elastic portion 54*a*, the second elastic portion 54*c* is narrower than the intermediate portion 54*b*. The above-mentioned configuration makes it possible to adjust which part of the second elastic portion 54*c* is to undergo elastic displacement.

The first elastic portion 54*a*, the intermediate portion 54*b*, and the second elastic portion 54*c* are formed integrally in the shape of a crank. The first elastic portion 54*a*, the intermediate portion 54*b*, and the second elastic portion 54*c* are positioned in this order in the mating direction from the mating side. The first elastic portion 54*a* and the second elastic portion 54*c* are symmetric to each other with respect to the intermediate portion 54*b*. More specifically, the first elastic portion 54*a* and the second elastic portion 54*c* are point-symmetric to each other with respect to the center of the intermediate portion 54*b*.

The first elastic portion 54*a* and the second elastic portion 54*c* extend from opposite ends of the intermediate portion 54*b* in the mating direction. More specifically, the first elastic portion 54*a* extends from the inner end of the upper edge part of the first adjustment portion 54*b*1. The second elastic portion 54*c* extends from the outer end of the lower edge part of the third adjustment portion 54*b*3. Thus, the connection point between the first elastic portion 54*a* and the intermediate portion 54*b*, and the connection point between the second elastic portion 54*c* and the intermediate portion 54*b* are positioned symmetrically to each other with respect to the center of the intermediate portion 54*b*. The first elastic portion 54*a* is contiguous with the intermediate portion 54*b* at its end opposite to an end that is contiguous with the first wide portion 51*a*. The second elastic portion 54*c* is contiguous with the intermediate portion 54*b* at its end opposite to an end that is contiguous with the second wide portion 55 described later. More specifically, the first elastic portion 54*a* is contiguous with the first wide portion 51*a* at its outer end, and contiguous with the intermediate portion 54*b* at its inner end. Likewise, the second elastic portion 54*c* is contiguous with the second wide portion 55 at its inner end, and contiguous with the intermediate portion 54*b* at its outer end.

The contact 50 has the second wide portion 55 contiguous with the second elastic portion 54*c*. The second wide portion 55 is provided near the inner end of the second elastic portion 54*c* such that the second wide portion 55 is adjacent to the second elastic portion 54*c*. The second wide portion 55 is positioned toward the movable insulator 30. The second wide portion 55 is positioned in contact attachment groove 35 of the movable insulator 30. The second wide portion 55 is not in direct locking engagement with the movable insulator 30 but is supported in place by means of locking engagement of a third locking portion 58 described later with the movable insulator 30.

The second wide portion 55 protrudes further toward the fixed insulator 20 in the front-back direction, relative to other parts of the contact 50 that extend along the movable insulator 30. More specifically, the second wide portion 55 protrudes one step further outward in the front-back direction, relative to a third elastic portion 56 described later, the third locking portion 58, and an elastic contacting portion 59.

The second wide portion 55 further protrudes toward the movable insulator 30 in the front-back direction, relative to other parts of the contact 50 that extend along the movable insulator 30. More specifically, over a wide region in the vertical direction, the second wide portion 55 protrudes one step further inward in the front-back direction relative to the third elastic portion 56 described later.

The second wide portion 55 is wider in the front-back direction than the third elastic portion 56, the third locking portion 58, and the elastic contacting portion 59. Likewise, the second wide portion 55 is wider than the second elastic portion 54*c*. The second wide portion 55 is thus generally larger in cross-sectional area than the second elastic portion 54*c*, the third elastic portion 56, the third locking portion 58, and the elastic contacting portion 59. Consequently, the second wide portion 55 has a higher electrical conductivity than the second elastic portion 54*c*, the third elastic portion 56, the third locking portion 58, and the elastic contacting portion 59. More specifically, the second wide portion 55 has a lower characteristic impedance than the second elastic portion 54*c*, the third elastic portion 56, the third locking portion 58, and the elastic contacting portion 59.

The contact 50 has the third elastic portion 56 capable of elastic deformation. The third elastic portion 56 extends upward from the second wide portion 55, and is disposed along the inner wall of the movable insulator 30. The third elastic portion 56 extends in the mating direction when the third elastic portion 56 is not under elastic deformation. The third elastic portion 56 faces, in its entirety, the wall 36 of the movable insulator 30, which is a wall located inside the third elastic portion 56. The contact 50 has a notch 57 defined in the surface of the third elastic portion 56 such that the notch 57 serves as an inflection point at which the third elastic portion 56 undergoes elastic deformation. The notch 57 is formed by cutting away the surface of the third elastic portion 56 in the middle part of the outer side of the third elastic portion 56 in the front-back direction.

The contact 50 has the third locking portion 58 located contiguously above the third elastic portion 56 and capable of locking engagement with the movable insulator 30. The third locking portion 58 is wider than the third elastic portion 56. The contact 50 has the elastic contacting portion 59 located contiguously above the third locking portion 58. The elastic contacting portion 59 comes into contact with the contact 90 of the connection object 60 during mating. The elastic contacting portion 59 is provided, for example, at the distal end of a portion of the contact 50, the portion extending contiguously from the second adjustment portion 54*b*2 in a direction opposite to the direction in which the first adjustment portion 54*b*1 extends from the second adjustment portion 54*b*2.

As illustrated in FIGS. 7 to 9, the second wide portion 55, the third elastic portion 56, the notch 57, and the third locking portion 58 are received in the contact attachment groove 35 of the movable insulator 30. The second wide portion 55, the third elastic portion 56, and the third locking portion 58 face, substantially in their entirety, the wall 36 of the movable insulator 30, which is a wall located inside these portions. The second wide portion 55, which connects the second elastic portion 54*c* and the third elastic portion 56, is positioned to face the lower end of the wall 36.

The second wide portion 55, and the lower half part of the third elastic portion 56 are received in a lower part of the contact attachment groove 35 that is defined as a recessed portion on the front and back surfaces of the movable insulator 30. The upper half part of the third elastic portion 56, and the third locking portion 58 are received in the middle part of the contact attachment groove 35 that is defined by the interior of the movable insulator 30. The notch 57 is defined in the surface of the third elastic portion 56 such that the notch 57 is located near the boundary between the lower part of the contact attachment groove 35 and the middle part of the contact attachment groove 35.

The elastic contacting portion 59 is located in an upper part of the contact attachment groove 35 that is defined as a recessed portion on the inner surface of the mating recess 33 of the movable insulator 30. The distal end of the elastic contacting portion 59 is exposed from the contact attachment groove 35 into the mating recess 33.

The connector 10 having the above-mentioned structure is positioned with respect to the circuit board CB1 by, for example, engagement of the boss 26 of the fixed insulator 20 with a given recess on the circuit board CB1. In this state, the mounting portion 53 of the contact 50 is soldered to a circuit pattern formed on the mounting surface of the circuit board CB1. The mounting portion 41 of the metal fitting 40 is soldered to the pattern formed on the mounting surface. In this way, the connector 10 is mounted onto the circuit board CB1. For example, an electronic component other than the connector 10, such as a central processing unit (CPU), a controller, or a memory, is mounted on the mounting surface of the circuit board CB1.

For example, with respect to the circuit pattern formed on the mounting surface of the circuit board CB1, multiple contacts 50 attached to one movable insulator 30 may be allocated for any combination of the following purposes: signal transmission, power supply, and grounding. For example, the multiple contacts 50 may include one or more contacts 50 whose mounting portions 53 are allocated for signal transmission, one or more contacts 50 whose mounting portions 53 are allocated for power supply, and one or more contacts 50 whose mounting portions 53 are allocated for grounding.

The structure of the connection object 60 is now described with reference to mainly FIGS. 12 and 13.

Figure 12:
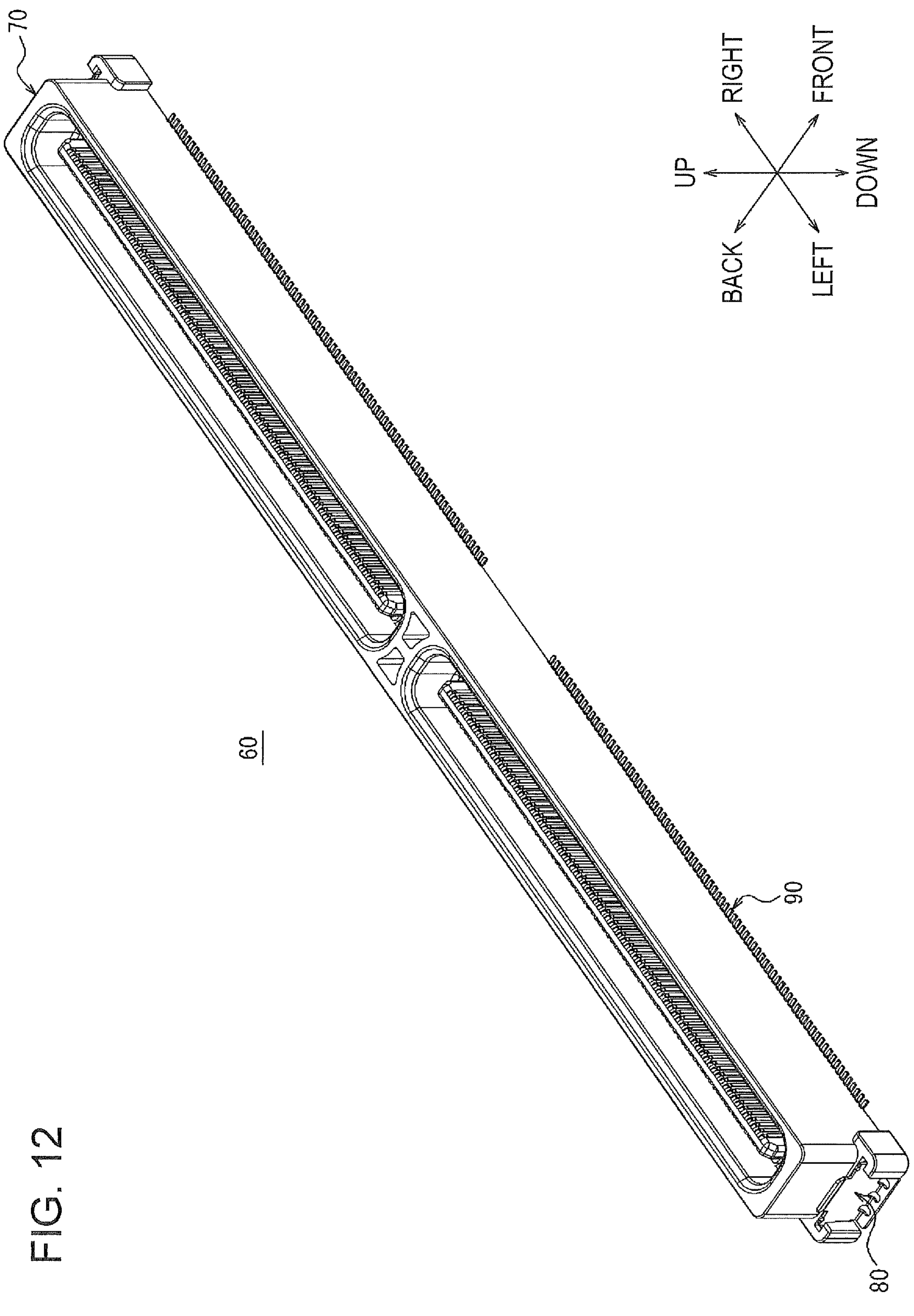
FIG. 12 is a top exterior perspective view of the connection object to be connected with the connector illustrated in FIG. 3.

FIG. 12 is a top exterior perspective view of the connection object 60 that is to be connected with the connector 10 illustrated in FIG. 3. FIG. 13 is a top exploded perspective view of the connection object 60 illustrated in FIG. 12.

Figure 13:
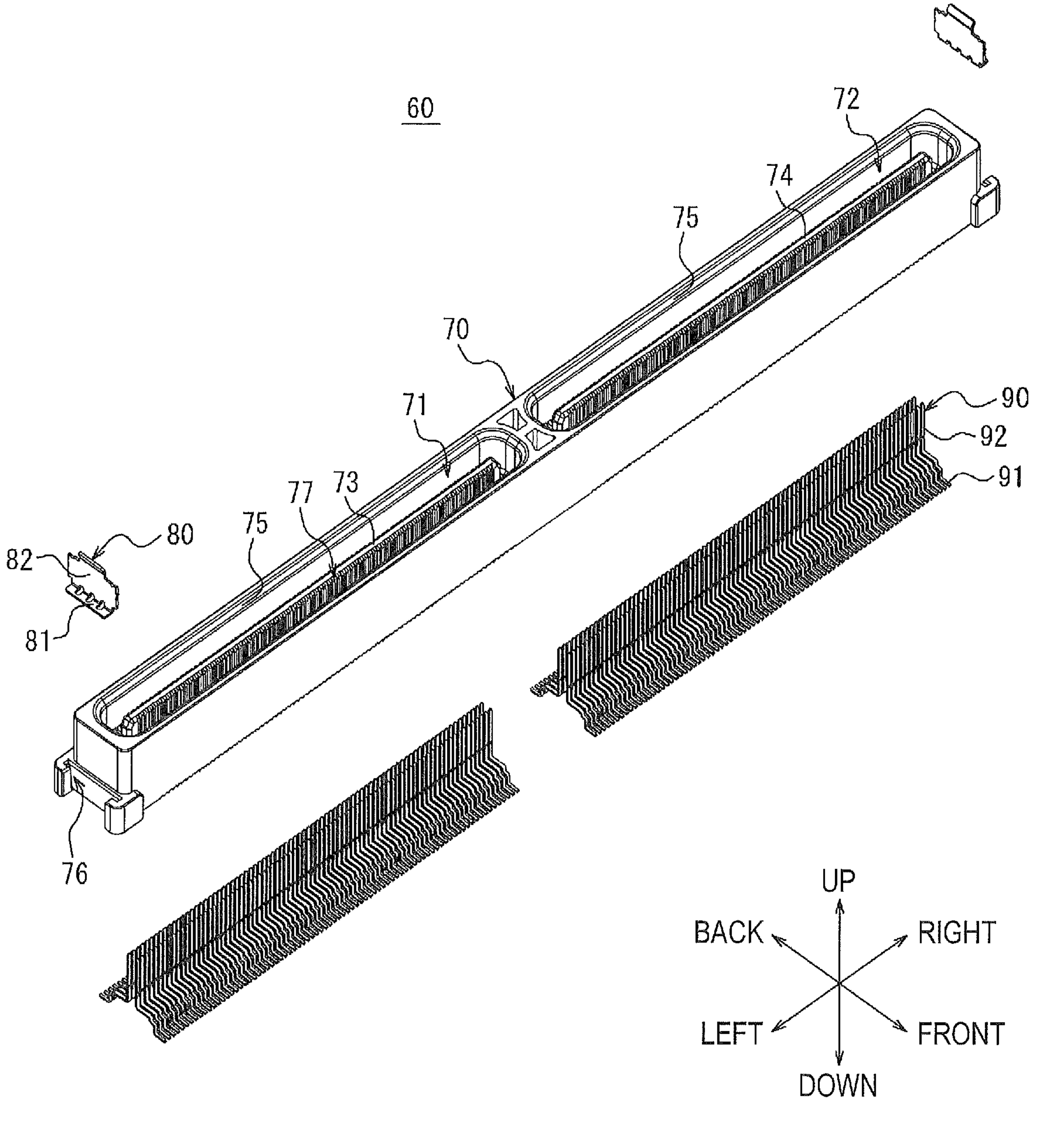
FIG. 13 is a top exploded perspective view of the connection object illustrated in FIG. 12.

As illustrated in FIG. 13, the connection object 60 includes the following major components: an insulator 70, a metal fitting 80, and the contacts 90. The connection object 60 is assembled by press-fitting the metal fitting 80 into the insulator 70 from above, and press-fitting each contact 90 into the insulator 70 from below.

The insulator 70 is a component in the shape of a quadrangular prism that is injection molded from a synthetic resin material having insulating and heat-resistant properties. The insulator 70 has a first mating recess 71 and a second mating recess 72, which are provided on the top side and arranged linearly in the left-right direction. The insulator 70 has a first mating projection 73 provided inside the first mating recess 71. The insulator 70 has a second mating projection 74 provided inside the second mating recess 72.

The insulator 70 has a guide portion 75 provided along the entire upper edge of each of the first mating recess 71 and the second mating recess 72 so as to surround the first mating recess 71 and the second mating recess 72. The guide portion 75 is an inclined surface defined at the upper edge of each of the first mating recess 71 and the second mating recess 72 and inclined obliquely outward in the upward direction. The insulator 70 has a metal-fitting attachment groove 76 that protrudes outward in the left-right direction from the left and right sides of the insulator 70. The metal fitting 80 is attached to the metal-fitting attachment groove 76.

The insulator 70 has multiple contact attachment grooves 77 provided on the front and back sides of the bottom portion and on the respective front and back surfaces of the first mating projection 73 and the second mating projection 74. Multiple contacts 90 are each attached to the corresponding one of the contact attachment grooves 77. The contact attachment grooves 77 are spaced from each other at predetermined intervals in the left-right direction.

The metal fitting 80 is obtained by forming a thin plate made of any desired metallic material into the shape illustrated in FIG. 13 by use of a progressive die (stamping). The metal fitting 80 is disposed at the left and right ends of the insulator 70. The metal fitting 80 has a mounting portion 81 provided at its lower end and extending outward in an L-shape. The metal fitting 80 has a locking portion 82 located contiguously above the mounting portion 81. The locking portion 82 is capable of locking engagement with the metal-fitting attachment groove 76 of the insulator 70.

The contact 90 is obtained by, for example, forming a thin plate made of a copper alloy having spring elasticity, such as phosphor bronze, beryllium copper, or titanium copper, or a Corson copper alloy into the shape illustrated in FIG. 13 by use of a progressive die (stamping). The surface of the contact 90 is applied with an undercoat of nickel plating, and then plated with gold, tin, or other metal.

Multiple contacts 90 are arranged in the left-right direction. Each contact 90 has a mounting portion 91 extending outward in an L-shape. The contact 90 has a contacting portion 92 at its upper end. The contacting portion 92 comes into contact with the elastic contacting portion 59 of the contact 50 when the connection object 60 and the connector 10 are mated together.

The connection object 60 having the above-mentioned structure is designed such that the mounting portion 91 of the contact 90 is soldered to a circuit pattern formed on the mounting surface of the circuit board CB2. The mounting portion 81 of the metal fitting 80 is soldered to the pattern formed on the mounting surface. In this way, the connection object 60 is mounted onto the circuit board CB2. For example, electronic components other than the connection object 60, such as a camera module and a sensor, are mounted on the mounting surface of the circuit board CB2.

For example, with respect to the circuit pattern formed on the mounting surface of the circuit board CB2, multiple contacts 90 may be allocated for any combination of the following purposes: signal transmission, power supply, and grounding. For example, the multiple contacts 90 may include one or more contacts 90 whose mounting portions 91 are allocated for signal transmission, one or more contacts 90 whose mounting portions 91 are allocated for power supply, and one or more contacts 90 whose mounting portions 91 are allocated for grounding.

Figure 14:
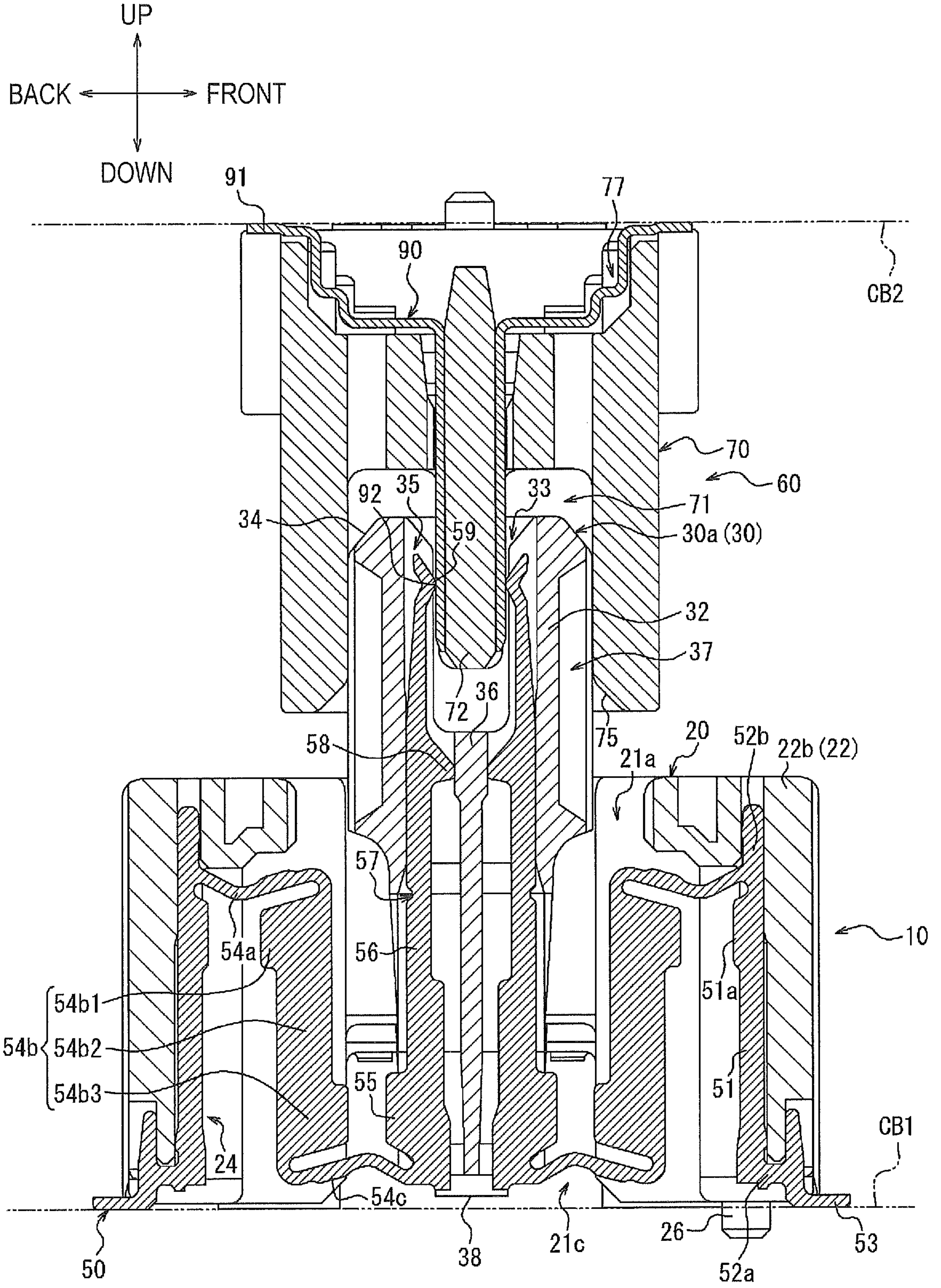
FIG. 14 is a cross-sectional view taken along an arrow line XIV-XIV illustrated in FIG. 1.

FIG. 14 is a cross-sectional view taken along an arrow line XIV-XIV illustrated in FIG. 1. Although the arrow line XIV-XIV is depicted in FIG. 1 as being positioned over the first movable insulator 30*a* of the movable insulator 30 by way of example, the same cross-section as that illustrated in FIG. 14 is obtained also for the second movable insulator 30*b*. Accordingly, the description given below with respect to the first movable insulator 30*a* similarly applies to the second movable insulator 30*b*. Reference is now made mainly to FIG. 14 to describe operation of the connector 10 having a floating structure.

The contact 50 of the connector 10 supports the first movable insulator 30*a* inside the fixed insulator 20, with the first movable insulator 30*a* being spaced apart from the fixed insulator 20 and in a floating condition. At this time, a lower part of the first movable insulator 30*a* is surrounded by the outer periphery wall 22 of the fixed insulator 20. An upper part of the first movable insulator 30*a* that includes the mating recess 33 projects upward from the first opening 21*a* of the fixed insulator 20.

As the mounting portion 53 of the contact 50 is soldered to the circuit board CB1, the fixed insulator 20 is fixed to the circuit board CB1. The first movable insulator 30*a* is allowed to move relative to the fixed insulator 20 fixed to the circuit board CB1, by virtue of elastic deformation of the first elastic portion 54*a*, the second elastic portion 54*c*, and the third elastic portion 56 of the contact 50.

As illustrated in FIGS. 4 and 5, the protruding wall 22*b*1 of the longitudinal wall 22*b* of the fixed insulator 20 restricts excessive movement of the first movable insulator 30*a* relative to the fixed insulator 20 in the front-back direction. If, for instance, the first movable insulator 30*a* moves in the front-back direction by a large amount exceeding a designed value as the contact 50 elastically deforms, the bottom portion 31 or the protrusion 31*a* of the first movable insulator 30*a* comes into contact with the protruding wall 22*b*1. More specifically, the left end of the bottom portion 31 of the first movable insulator 30*a* comes into contact with the protruding wall 22*b*1 located at the left end of the longitudinal wall 22*b*. The protrusion 31*a* of the first movable insulator 30*a* comes into contact with the protruding wall 22*b*1 located in the middle of the longitudinal wall 22*b*. As a result, the first movable insulator 30*a* does not move further outward in the front-back direction.

The lateral wall 22*a* and the division wall 25 of the fixed insulator 20 restrict excessive movement of the first movable insulator 30*a* relative to the fixed insulator 20 in the left-right direction. If, for instance, the first movable insulator 30*a* moves in the left-right direction by a large amount exceeding a designed value as the contact 50 elastically deforms, the mating projection 32 of the first movable insulator 30*a* comes into contact with the lateral wall 22*a* or the division wall 25. As a result, the first movable insulator 30*a* does not move further outward in the left-right direction.

The projection 38 of the first movable insulator 30*a* restricts excessive downward movement of the first movable insulator 30*a* relative to the fixed insulator 20. If, for instance, the first movable insulator 30*a* moves downward by a large amount exceeding a designed value as the contact 50 elastically deforms, the projection 38 of the first movable insulator 30*a* comes into contact with the surface of the circuit board CB1. As a result, the first movable insulator 30*a* does not move further downward.

With the connection object 60 in an inverted orientation relative to the connector 10 having the floating structure mentioned above, the connector 10 and the connection object 60 are placed facing each other such that the connector 10 and the connection object 60 are substantially aligned with each other at their front and back positions and at their left and right positions. The connection object 60 is then moved downward. At this time, even if the connector 10 and the connection object 60 are slightly misaligned relative to each other in, for example, the front-back and left-right directions, the guide portion 34 of the connector 10, and the guide portion 75 of the connection object 60 come into contact with each other. As a result, due to the floating structure of the connector 10, the first movable insulator 30*a* and the second movable insulator 30*b* move relative to the fixed insulator 20. More specifically, the mating projection 32 of the first movable insulator 30*a* is guided into the first mating recess 71 of the insulator 70. The mating projection 32 of the second movable insulator 30*b* is guided into the second mating recess 72 of the insulator 70.

As the connection object 60 is moved further downward, the mating projection 32 of the first movable insulator 30*a*, and the first mating recess 71 of the insulator 70 come into mating engagement with each other. The mating projection 32 of the second movable insulator 30*b*, and the second mating recess 72 of the insulator 70 come into mating engagement with each other. At this time, the mating recess 33 of the first movable insulator 30*a*, and the first mating projection 73 of the insulator 70 come into mating engagement with each other. The mating recess 33 of the second movable insulator 30*b*, and the second mating projection 74 of the insulator 70 come into mating engagement with each other.

When the movable insulator 30 of the connector 10, and the insulator 70 of the connection object 60 are in their mated condition, the contact 50 of the connector 10, and the contact 90 of the connection object 60 are in contact each other. More specifically, the elastic contacting portion 59 of the contact 50, and the contacting portion 92 of the contact 90 are in contact with each other. At this time, the distal end of the elastic contacting portion 59 of the contact 50 undergoes slight outward elastic deformation, and undergoes elastic displacement toward the inner part of the contact attachment groove 35.

In this way, the connector 10 and the connection object 60 are fully connected. At this time, the circuit board CB1 and the circuit board CB2 are electrically connected to each other via the contact 50 and the contact 90.

In this state, a pair of elastic contacting portions 59 of the contacts 50 clamp a pair of contacts 90 of the connection object 60 from the front and back sides by means of an elastic force exerted inward in the front-back direction. Due to the reaction to the resulting pressing force exerted on the contact 90 of the connection object 60, in withdrawing the connection object 60 from the connector 10, the movable insulator 30 is subjected to a force exerted via the contact 50 in the direction of withdrawal, that is, in the upward direction. Even if the movable insulator 30 moves upward as a result, the division wall 25 of the fixed insulator 20, and the retaining portion 43 of the metal fitting 40 press-fit into the fixed insulator 20 prevent or reduce upward disengagement of the movable insulator 30.

For example, the division wall 25 of the fixed insulator 20 is located directly above the protrusion 31*a* of the movable insulator 30 disposed inside the fixed insulator 20. Likewise, the retaining portion 43 of the metal fitting 40 press-fit into the fixed insulator 20 is located at a position inside the fixed insulator 20 that is directly above the left and right ends of the bottom portion 31 of the movable insulator 30. Accordingly, when the movable insulator 30 is about to move upward, the protrusion 31*a* comes into contact with the division wall 25, and the outwardly protruding left and right ends of the bottom portion 31 come into contact with the retaining portion 43. As a result, the movable insulator 30 does not move further upward.

Figure 15:
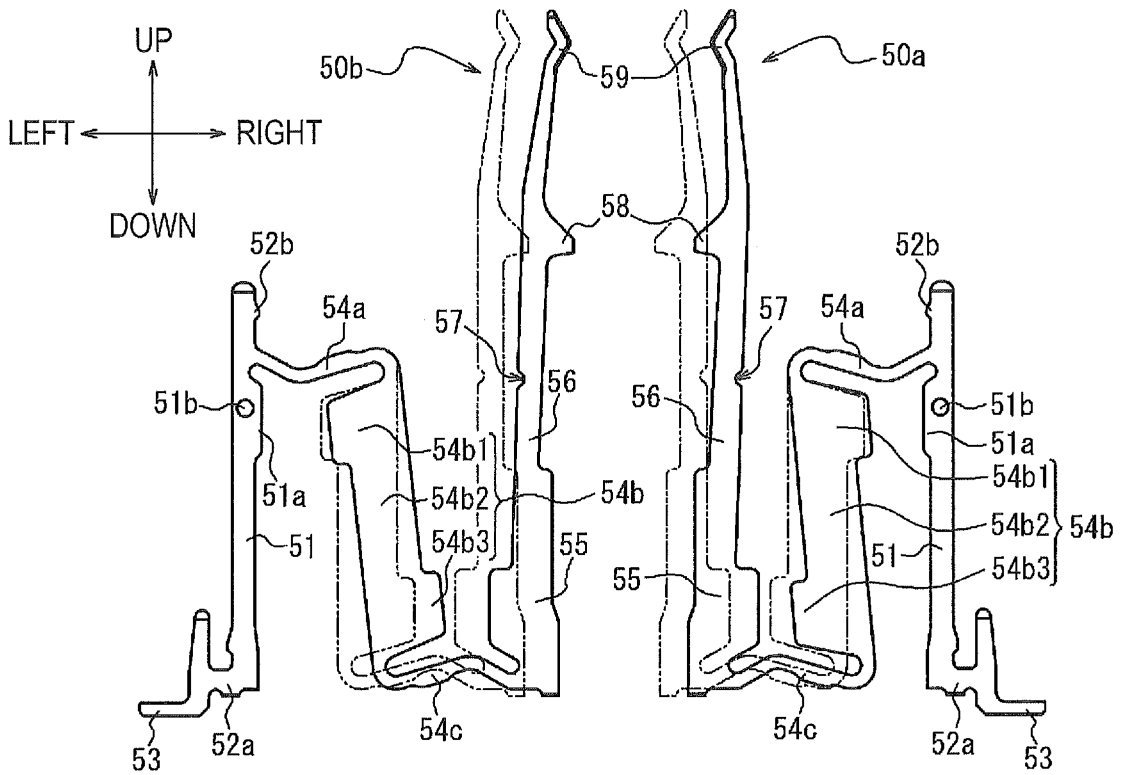
FIG. 15 schematically illustrates a first example of elastic deformation of a pair of contacts illustrated in FIG. 6.
Figure 16:
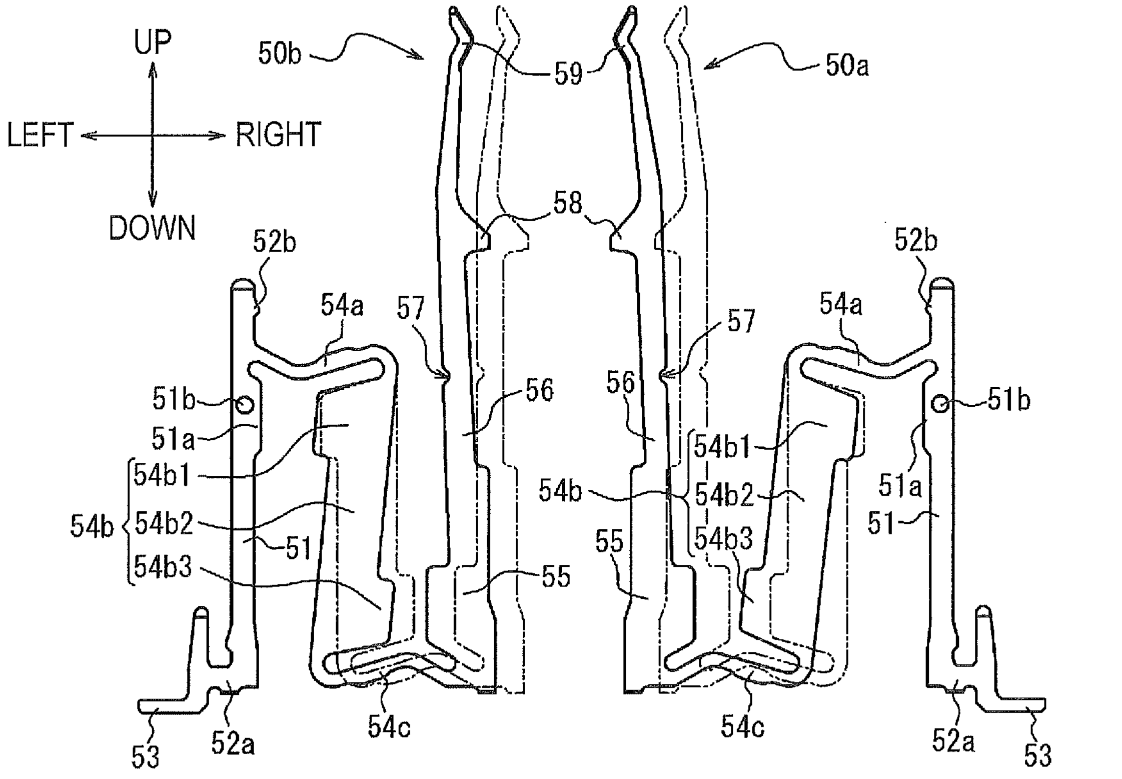
FIG. 16 schematically illustrates a second example of elastic deformation of a pair of contacts illustrated in FIG. 6.

FIG. 15 schematically illustrates a first example of elastic deformation of a pair of contacts 50 illustrated in FIG. 6. FIG. 16 schematically illustrates a second example of elastic deformation of a pair of contacts 50 illustrated in FIG. 6.

Reference is now made to FIGS. 15 and 16 to describe in detail how individual structural features operate during elastic deformation of a pair of contacts 50. For the convenience of explanation, the contact 50 on the right side of FIGS. 15 and 16 will be hereinafter referred to as a contact 50*a*, and the contact 50 on the left side of FIGS. 15 and 16 will be hereinafter referred to as a contact 50*b*. The two-dot chain lines in FIGS. 15 and 16 represent the contacts 50*a* and 50*b* when these contacts are not undergoing elastic deformation.

It is assumed in FIG. 15 by way of example that the movable insulator 30 has' moved to the right due to some external factor.

When the movable insulator 30 moves to the right, the third locking portion 58 of the contact 50*a* is pushed to the right by the wall 36 of the movable insulator 30. At this time, the third elastic portion 56 of the contact 50*a* begins to deflect inward at a location near the notch 57. The third elastic portion 56 of the contact 50*a* undergoes greater inward elastic deformation in a part of the third elastic portion 56 below the vicinity of the notch 57, than in a part of the third elastic portion 56 above the vicinity of the notch 57. As for the third locking portion 58 of the contact 50*a* that is in contact with the wall 36 of the movable insulator 30, the position of the third locking portion 58 relative to the movable insulator 30 hardly changes. Meanwhile, the relative position of the second wide portion 55 of the contact 50*a* changes inward.

When the third elastic portion 56 of the contact 50*a* moves to the right, the second elastic portion 54*c* elastically deforms, and the connection point between the second elastic portion 54*c* and the intermediate portion 54*b* also moves to the right. Meanwhile, the position of the connection point between the first elastic portion 54*a* and the intermediate portion 54*b* changes only slightly in the left-right direction. Accordingly, the first elastic portion 54*a* elastically deforms, and the bent portion at the inner end of the first elastic portion 54*a* bends outward. This causes the intermediate portion 54*b* to tilt obliquely to the right from its upper part toward the lower part.

When the movable insulator 30 moves to the right, the third locking portion 58 of the contact 50*b* is pushed to the right by the inner wall of the movable insulator 30. At this time, the third elastic portion 56 of the contact 50*b* begins to deflect outward at a location near the notch 57. The third elastic portion 56 of the contact 50*b* undergoes greater outward elastic deformation in a part of the third elastic portion 56 below the vicinity of the notch 57, than in a part of the third elastic portion 56 above the vicinity of the notch 57. As for the third locking portion 58 of the contact 50*b* that is in contact with the inner wall of the contact attachment groove 35, the position of the third locking portion 58 relative to the movable insulator 30 hardly changes. Meanwhile, the relative position of the second wide portion 55 of the contact 50*b* changes outward.

When the third elastic portion 56 of the contact 50*b* moves to the right, the second elastic portion 54*c* elastically deforms, and the connection point between the second elastic portion 54*c* and the intermediate portion 54*b* also moves to the right. Meanwhile, the position of the connection point between the first elastic portion 54*a* and the intermediate portion 54*b* changes only slightly in the left-right direction. Accordingly, the first elastic portion 54*a* elastically deforms, and the bent portion at the inner end of the first elastic portion 54*a* deflects inward. This causes the intermediate portion 54*b* to tilt obliquely to the right from its upper part toward the lower part.

It is assumed in FIG. 16 by way of example that the movable insulator 30 has moved to the left due to some external factor.

When the movable insulator 30 moves to the left, the third locking portion 58 of the contact 50*a* is pushed to the left by the inner wall of the movable insulator 30. At this time, the third elastic portion 56 of the contact 50*a* begins to deflect outward at a location near the notch 57. The third elastic portion 56 of the contact 50*a* undergoes greater outward elastic deformation in a part of the third elastic portion 56 below the vicinity of the notch 57, than in a part of the third elastic portion 56 above the vicinity of the notch 57. As for the third locking portion 58 of the contact 50*a* that is in contact with the inner wall of the contact attachment groove 35, the position of the third locking portion 58 relative to the movable insulator 30 hardly changes. Meanwhile, the relative position of the second wide portion 55 of the contact 50*a* changes outward.

When the third elastic portion 56 of the contact 50*a* moves to the left, the second elastic portion 54*c* elastically deforms, and the connection point between the second elastic portion 54*c* and the intermediate portion 54*b* also moves to the left. Meanwhile, the position of the connection point between the first elastic portion 54*a* and the intermediate portion 54*b* changes only slightly in the left-right direction. Accordingly, the first elastic portion 54*a* elastically deforms, and the bent portion at the inner end of the first elastic portion 54*a* deflects inward. This causes the intermediate portion 54*b* to tilt obliquely to the left from its upper part toward the lower part.

When the movable insulator 30 is moved to the left, the third locking portion 58 of the contact 50*b* is pushed to the left by the wall 36 of the movable insulator 30. At this time, the third elastic portion 56 of the contact 50*b* begins to deflect inward at a location near the notch 57. The third elastic portion 56 of the contact 50*b* undergoes greater inward elastic deformation in a part of the third elastic portion 56 below the vicinity of the notch 57, than in a part of the third elastic portion 56 above the vicinity of the notch 57. As for the third locking portion 58 of the contact 50*b* that is in contact with the wall 36 of the movable insulator 30, the position of the third locking portion 58 relative to the movable insulator 30 hardly changes. Meanwhile, the relative position of the second wide portion 55 of the contact 50*b* changes inward.

When the third elastic portion 56 of the contact 50*b* moves to the left, the second elastic portion 54*c* elastically deforms, and the connection point between the second elastic portion 54*c* and the intermediate portion 54*b* also moves to the left. Meanwhile, the position of the connection point between the first elastic portion 54*a* and the intermediate portion 54*b* changes only slightly in the left-right direction. Accordingly, the first elastic portion 54*a* elastically deforms, and the bent portion at the inner end of the first elastic portion 54*a* bends outward. This causes the intermediate portion 54*b* to tilt obliquely to the left from its upper part toward the lower part.

The connector 10 according to the embodiment described above has a floating structure, and capable of mitigating the load exerted on the movable insulator 30 and the fixed insulator 20 that are in mating engagement with the connection object 60. This helps to prevent or reduce damage to these insulators such as breakage or deformation. For example, the movable insulator 30 includes the first movable insulator 30*a* and the second movable insulator 30*b* that are separate from each other. This helps to ensure that even if the connection object 60 moves when the connection object 60 and the connector 10 are in their mated condition, the load such as stress exerted on the movable insulator 30 that is in mating engagement with the connection object 60 is mitigated. For example, the movable insulator 30 includes the first movable insulator 30*a* and the second movable insulator 30*b* that are separate from each other. This helps to mitigate the load that is exerted on the fixed insulator 20 due to, for example, collision of one movable insulator 30 as the connection object 60 moves when in the mated condition. The load mitigation effect becomes greater as, for example, the connector 10 becomes longer due to an increase in the number of poles.

Moreover, the movable insulator 30 is divided into two separate parts, which means that the first movable insulator 30*a* and the second movable insulator 30*b* are able to move individually. This allows for improved movability of the movable insulator 30 in comparison to a case where these movable insulators are integrated with each other. Therefore, the first mating recess 71 and the second mating recess 72 of the connection object 60, and the movable insulator 30 are easily guided toward each other. This makes it possible to achieve an improved floating structure for the connector 10.

The division wall 25 of the fixed insulator 20 overlaps the protrusion 31*a* of the movable insulator 30 from the mating side. Accordingly, when the movable insulator 30 is about to move upward, the protrusion 31*a* comes into contact with the division wall 25. As a result, the movable insulator 30 does not move further upward. This prevents or reduces upward disengagement of the movable insulator 30 from the fixed insulator 20.

The distal end of the first protrusion of the first movable insulator 30*a* is positioned further toward the second movable insulator 30*b* relative to the distal end of the second protrusion of the second movable insulator 30*b*. This ensures that even if the division wall 25 is reduced in width in the left-right direction, the width of overlap, as viewed from the mating side, between the division wall 25 and the protrusion 31*a* in the left-right direction is maintained. Therefore, even if the division wall 25 is reduced in width in the left-right direction to allow for increased amount of movement of the movable insulator 30, upward disengagement of the movable insulator 30 from the fixed insulator 20 is effectively prevented or reduced.

The first movable insulator 30*a* and the second movable insulator 30*b* are arranged linearly in the direction of arrangement of the contacts 50. This makes it possible to increase the width of the connector 10 in one direction, that is, the left-right direction, and reduce the width of the connector 10 in another direction, that is, the front-back direction.

The first movable insulator 30*a* and the second movable insulator 30*b* are identical to each other in shape. This facilitates manufacture of the movable insulator 30. This leads to improved efficiency of production of the connector 10, and consequently reduced manufacturing cost of the connector 10.

The connector 10 is designed to allow for improved signal transmission characteristics. The presence of the intermediate portion 54*b* in the contact 50 of the connector 10 makes it possible to adjust the characteristic impedance in the corresponding part of the contact 50 toward an ideal value. More specifically, the first elastic portion 54*a* and the second elastic portion 54*c* of the contact 50 are designed to have a reduced width (reduced cross-sectional area) to allow for increased amount of elastic deformation. Accordingly, the characteristic impedance adjusted to an ideal value increases in the first elastic portion 54*a* and the second elastic portion 54*c*. The presence of the intermediate portion 54*b* makes it possible to intentionally reduce the amount of such increase in characteristic impedance. As described above, the intermediate portion 54*b* serves to reduce the amount of increase in characteristic impedance in the first elastic portion 54*a* and the second elastic portion 54*c* to thereby make the overall characteristic impedance closer to an ideal value.

This makes it easier for the connector 10 to achieve desired transmission characteristics even in large-volume, high-speed transmissions. The connector 10 allows for improved transmission characteristics in comparison to conventional electrical connectors that do not have the adjustment portions provided in the intermediate portion 54*b*.

As described above, the contact 50 has the first wide portion 51*a*, and the second wide portion 55. Accordingly, the characteristic impedance is adjusted in accordance with the width of each of these transmission paths, that is, the cross-sectional area of each of these transmission paths. For example, the first wide portion 51*a* and the second wide portion 55 protrude in the front-back direction so as to have an increased width. This makes the characteristic impedance in the corresponding parts of the contact 50 closer to an ideal value. More specifically, the presence of the first wide portion 51*a* and the second wide portion 55 makes it possible to intentionally reduce the amount of increase in characteristic impedance in the first elastic portion 54*a* and the second elastic portion 54*c*. In this way, the characteristic impedance is adjusted by means of the first wide portion 51*a* and the second wide portion 55. Accordingly, these structural portions make it possible to reduce the amount of increase in characteristic impedance in the first elastic portion 54*a* and the second elastic portion 54*c* to thereby make the characteristic impedance closer to an ideal value.

The contact 50 is designed such that the wide portions of the contact 50 protrude in the front-back direction. The entire shape of the contact 50 can be thus formed by blanking alone. This leads to improved efficiency of production of the contact 50. Further, the contact 50 can be easily manufactured even if the contact 50 is designed to have a complex shape. Therefore, the contact 50 can be manufactured while maintaining its precise shape that is optimized for desired transmission characteristics. This leads to improved efficiency of production of the contact 50, and consequently improved efficiency of production of the connector 10.

The first wide portion 51*a* and the second wide portion 55 are respectively contiguous with the first elastic portion 54*a* and the second elastic portion 54*c*. This configuration helps to increase the effect of each wide portion on the corresponding elastic portion having a comparatively small width. As a result, the characteristic impedance of each elastic portion is reduced more effectively. This effectively reduces the amount of increase in characteristic impedance in each elastic portion.

As described below, the connector 10 makes it possible to achieve an improved floating structure, in addition to the improved signal transmission characteristics mentioned above.

The contact 50 of the connector 10 has the second elastic portion 54*c*. This allows for increased amount of movement of the movable insulator 30 relative to the fixed insulator 20. More specifically, due to the elastic deformation of the second elastic portion 54*c* in addition to the elastic deformation of the first elastic portion 54*a*, the amount of possible movement of the movable insulator 30 relative to the fixed insulator 20 increases.

The contact 50 of the connector 10 further has the third elastic portion 56. This allows for increased amount of movement of the movable insulator 30 relative to the fixed insulator 20. More specifically, due to the elastic deformation of the third elastic portion 56 in addition to the elastic deformation of each of the first elastic portion 54*a* and the second elastic portion 54*c*, the amount of possible movement of the movable insulator 30 relative to the fixed insulator 20 increases.

The movable insulator 30 has the wall 36 positioned to face the second wide portion 55. This prevents or reduces contact between the pair of contacts 50 illustrated in FIG. 9 that are arranged symmetrically to each other in the front-back direction. As described above, the second wide portion 55, which connects the second elastic portion 54*c* and the third elastic portion 56, moves in, for example, the front-back direction in FIG. 9 as the second elastic portion 54*c* and the third elastic portion 56 deform elastically. At this time, if the movable insulator 30 does not have the wall 36, the respective second wide portions 55 of the pair of contacts 50 at the front and back may come into contact with each other depending on the respective elastic deformation states of the above-mentioned elastic portions.

The presence of the wall 36 prevents or reduces such contact between the second wide portions 55, and consequently prevents or reduces electrically-induced failures such as short-circuiting and mechanically induced failures such as breakage. In other words, the presence of the wall 36 in the connector 10 helps to restrict excessive elastic deformation of the third elastic portion 56. This allows the connector 10 to maintain its reliability as a product, even in situations where the second wide portion 55 moves as the second elastic portion 54*c* and the third elastic portion 56 deform elastically.

The connector 10 is designed such that the first adjustment portion 54*b*1 protrudes one step further outward in the front-back direction relative to the second adjustment portion 54*b*2, and the third adjustment portion 54*b*3 protrudes one step further inward in the front-back direction relative to the second adjustment portion 54*b*2. This design ensures that, as illustrated in FIGS. 15 and 16, even if the contact 50 elastically deforms, neither the first adjustment portion 54*b*1 nor the third adjustment portion 54*b*3 comes into contact with other parts of the contact 50 or with the movable insulator 30. The above configuration of the connector 10 ensures that the respective protrusions of the first adjustment portion 54*b*1 and the third adjustment portion 54*b*3 do not hinder elastic deformation of the contact 50. This allows for smooth movement of the movable insulator 30, which contributes to an improved floating structure.

The connector 10 is designed such that the first elastic portion 54*a* and the second elastic portion 54*c* extend from opposite ends of the intermediate portion 54*b* in the mating direction. This allows the intermediate portion 54*b* to be able to move by a required amount. Therefore, the connector 10 allows the movable insulator 30 to move by a required amount. The connector 10 is designed such that the first elastic portion 54*a*, the intermediate portion 54*b*, and the second elastic portion 54*c* are formed integrally in the shape of a crank. In addition to providing the above-mentioned effect, this configuration also contributes to reducing the width of the connector 10 in the front-back direction illustrated in FIG. 9. For example, the first elastic portion 54*a* extends from the inner end at the upper edge of the intermediate portion 54*b*, and the second elastic portion 54*c* extends from the outer end at the lower edge of the intermediate portion 54*b*. The above configuration leads to reduced overall width of the connector 10 in the front-back direction. Additionally, the above configuration makes it possible to, within the limited area inside the fixed insulator 20, increase the length of the elastically deformable part of each of the first elastic portion 54*a* and the second elastic portion 54*c*. This leads to an improved floating structure.

The first elastic portion 54*a*, the intermediate portion 54*b*, and the second elastic portion 54*c* are positioned in this order in the mating direction from the mating side. Accordingly, the second wide portion 55 connected to the second elastic portion 54*c* is located at the lowermost position. This configuration allows the third elastic portion 56 to be extended for increased elastic deformation. This allows for increased amount of movement of the movable insulator 30 relative to the fixed insulator 20.

The connector 10 is designed such that the contact 50 has the notch 57. This helps to mitigate the force that, in response to movement of the movable insulator 30, acts on the third locking portion 58 that is in contact with the inner wall of the movable insulator 30. Likewise, the connector 10 is designed to mitigate the force that acts on the elastic contacting portion 59 located in an upper part of the contact attachment groove 35. The connector 10 is designed to allow the third elastic portion 56 to deflect in a part of the third elastic portion 56 below the vicinity of the notch 57. More specifically, the connector 10 is designed such that the third elastic portion 56 undergoes a greater amount of elastic deformation in the lower half part than in the upper half part that extends from the lower end of the third locking portion 58 to the vicinity of the notch 57. In this way, with the third locking portion 58 in secure locking engagement with the movable insulator 30 and with the elastic contacting portion 59 in secure contact with the contacting portion 92, the third elastic portion 56 can contribute to the movement of the movable insulator 30 relative to the fixed insulator 20.

The contact 50 is made of a metallic material with a small elastic modulus. The connector 10 thus ensures that the movable insulator 30 is able to move by a required amount with the application of even a small amount of force to the movable insulator 30. The movable insulator 30 is capable of smooth movement relative to the fixed insulator 20. This allows the connector 10 to easily absorb misalignment that may occur during mating of the connector 10 with the connection object 60.

The connector 10 is designed such that the elastic portions of the contact 50 absorb potential vibrations caused by some external factor. This reduces the risk of a large force being applied to the mounting portion 53. Consequently, damage to the connecting part between the mounting portion 53 and the circuit board CB1 is prevented or reduced. This helps to prevent or reduce cracking of the solder at the connecting part between the circuit board CB1 and the mounting portion 53. Therefore, when the connector 10 and the connection object 60 are in their connected state, the reliability of the connection improves.

The contact 50 has the second wide portion 55 with an increased width. This helps to facilitate the assembly of the connector 10. More specifically, the increased width of the second wide portion 55 leads to increased rigidity of the second wide portion 55. This allows the contact 50 to be inserted from below the fixed insulator 20 and the movable insulator 30 by means of an assembling device or other device, with the second wide portion 55 serving as the point of support.

The metal fitting 40 is press-fit into the fixed insulator 20, and the mounting portion 41 is soldered to the circuit board CB1. This configuration allows the metal fitting 40 to securely fix the fixed insulator 20 to the circuit board CB1. The metal fitting 40 helps to improve the strength with which the fixed insulator 20 is mounted to the circuit board CB1.

It will be apparent to those skilled in the art that the present disclosure may be implemented in predetermined manners other than the embodiment described above, without departing from the spirit and essential features of the present disclosure. The foregoing description, therefore, is intended to be illustrative rather than limiting. The scope of the present disclosure is defined not by the foregoing description but by the appended claims. The scope of the present disclosure is to be construed to cover all such modifications that may fall within the scope of its equivalents.

For example, the shapes, the arrangements, the orientations, and the numbers of individual structural features described above are not limited to those described above and illustrated in the drawings. The shapes, the arrangements, the orientations, and the numbers of the individual structural features may be determined as desired as long as the intended functions of such structural features can be achieved.

The connector 10 and the connection object 60 may not necessarily be assembled by the method described above. The connector 10 and the connection object 60 may be assembled by any method that allows the respective functions of the connector 10 and the connection object 60 to be achieved. For example, at least one of the metal fitting 40 and the contact 50 may be formed integrally with at least one of the fixed insulator 20 and the movable insulator 30 by insert molding, rather than press-fitting.

Although the connector 10 has been described above as having two movable insulators 30 including the first movable insulator 30*a* and the second movable insulator 30*b*, the number of movable insulators 30 is not limited to two. Alternatively, the connector 10 may have three or more movable insulators 30.

Although it has been described above that the protrusion 31*a* of the first movable insulator 30*a* protrudes toward the second movable insulator 30*b* from a side near the second movable insulator 30*b*, and that the protrusion 31*a* of the second movable insulator 30*b* protrudes toward the first movable insulator 30*a* from a side near the first movable insulator 30*a*, this is not intended to be limiting. Alternatively, for example, the protrusion 31*a* of the movable insulator 30 may protrude outward from at least one of the front and back surfaces of the bottom portion 31 of the movable insulator 30.

Although it has been described above that the division wall 25 of the fixed insulator 20 overlaps the first protrusion and the second protrusion from the mating side, this is not intended to be limiting. Alternatively, for example, the metal fitting 40 may be attached to the division wall 25, and the metal fitting 40, rather than the fixed insulator 20, may overlap the first protrusion and the second protrusion from the mating side. More specifically, the retaining portion 43 of the metal fitting 40 may overlap the first protrusion and the second protrusion from the mating side. This allows the retaining portion 43 to prevent or reduce upward disengagement of the movable insulator 30 from the fixed insulator 20. Similarly, the division wall 25 of the fixed insulator 20, and the retaining portion 43 of the metal fitting 40 may both overlap the first protrusion and the second protrusion from the mating side.

Although it has been described above that the distal end of the first protrusion is positioned further toward the second movable insulator 30*b* relative to the distal end of the second protrusion, this is not intended to be limiting. Alternatively, for example, the distal end of the first protrusion may be positioned further toward the first movable insulator 30*a* relative to the distal end of the second protrusion. At this time, the bottom portion 31 of the first movable insulator 30*a*, that is, the right side of the protrusion 31*a*, and the bottom portion 31 of the second movable insulator 30*b*, that is, the left side of the protrusion 31*a* may face each other.

Although it has been described above that the first movable insulator 30*a* and the second movable insulator 30*b* are disposed linearly in the direction of arrangement of the contacts 50, this is not intended to be limiting. The first movable insulator 30*a* and the second movable insulator 30*b* may be disposed inside the fixed insulator 20 in any desired positional relationship. For example, the first movable insulator 30*a* and the second movable insulator 30*b* may be disposed in the front-back direction such that the front and back surfaces of the movable insulators 30 face each other. At this time, the protrusion 31*a* of the movable insulator 30 may protrude from at least one of the front and back surfaces of the bottom portion 31 of the movable insulator 30. However, this is not intended to be limiting.

Alternatively, the protrusion 31*a* of the movable insulator 30 may protrude outward from at least one of the left and right sides of the bottom portion 31 of the movable insulator 30. For example, the first movable insulator 30*a* and the second movable insulator 30*b* may be disposed in an L-shape.

Figure 17:
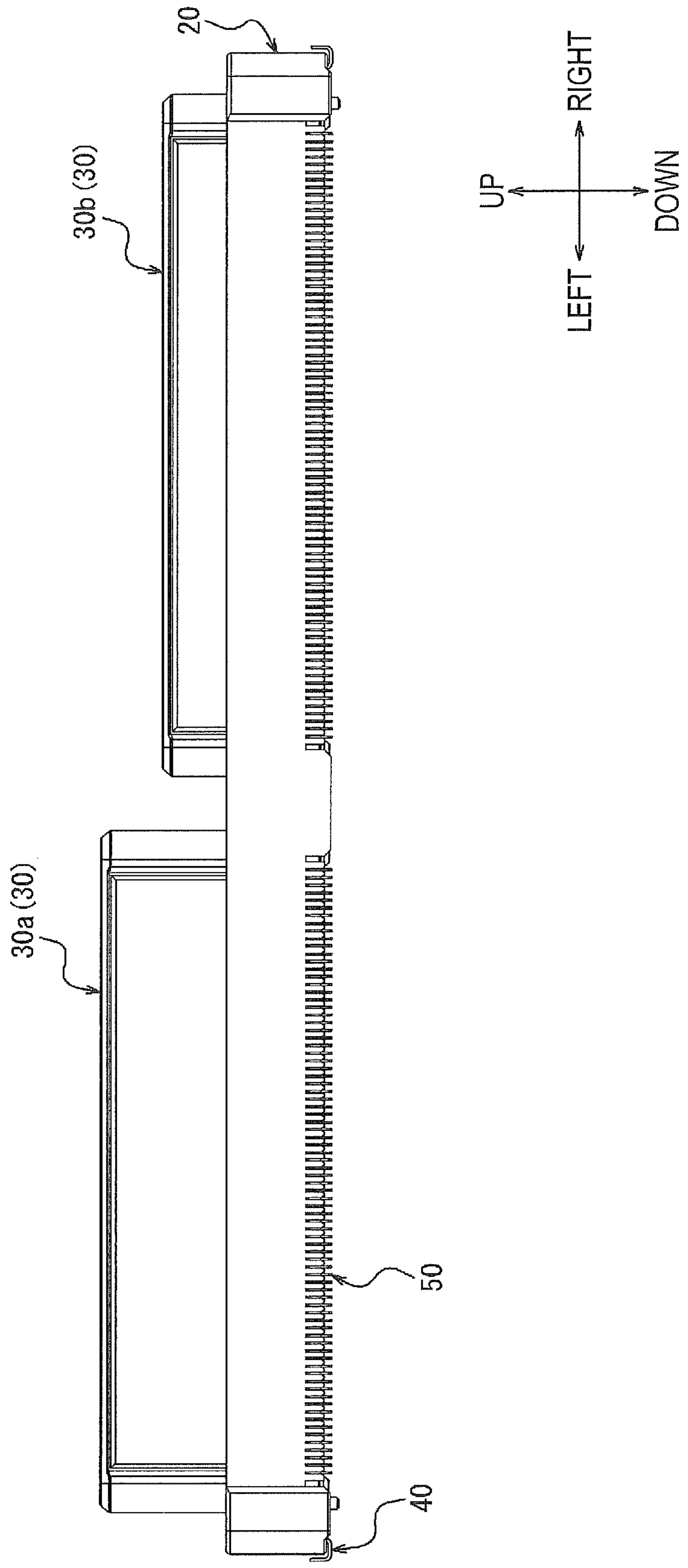
FIG. 17 is a front view of a first modification of the connector illustrated in FIG. 3.

FIG. 17 is a front view of a first modification of the connector 10 illustrated in FIG. 3. Although it has been described above that the first movable insulator 30*a* and the second movable insulator 30*b* are identical to each other in shape, this is not intended to be limiting. Alternatively, the first movable insulator 30*a* and the second movable insulator 30*b* may be different from each other in shape. For example, the first movable insulator 30*a* and the second movable insulator 30*b* may have different lengths in the mating direction in which the connection object 60 and the movable insulator 30 are mated to each other. In one example, the connector 10 illustrated in FIG. 17 is designed such that the first movable insulator 30*a* has a greater height than the second movable insulator 30*b*.

Although it has been described above that a set of the connection object 60 and the circuit board CB2 is connected to two movable insulators 30, this is not intended to be limiting. Alternatively, for example, two different sets of the connection object 60 and the circuit board CB2 may be each connected to the corresponding one of the two movable insulators 30 of the connector 10.

For example, the first movable insulator 30*a* and the second movable insulator 30*b* are designed to have different heights as illustrated in FIG. 17. This allows each of the two different sets of the connection object 60 and the circuit board CB2 to be easily connected to the corresponding one of the two movable insulators 30.

Likewise, the first movable insulator 30*a* and the second movable insulator 30*b* may have different lengths in the direction of arrangement of the contacts 50. At this time, the number of contacts 50 attached to the first movable insulator 30*a*, and the number of contacts 50 attached to the second movable insulator 30*b* may differ from each other.

Figure 18:
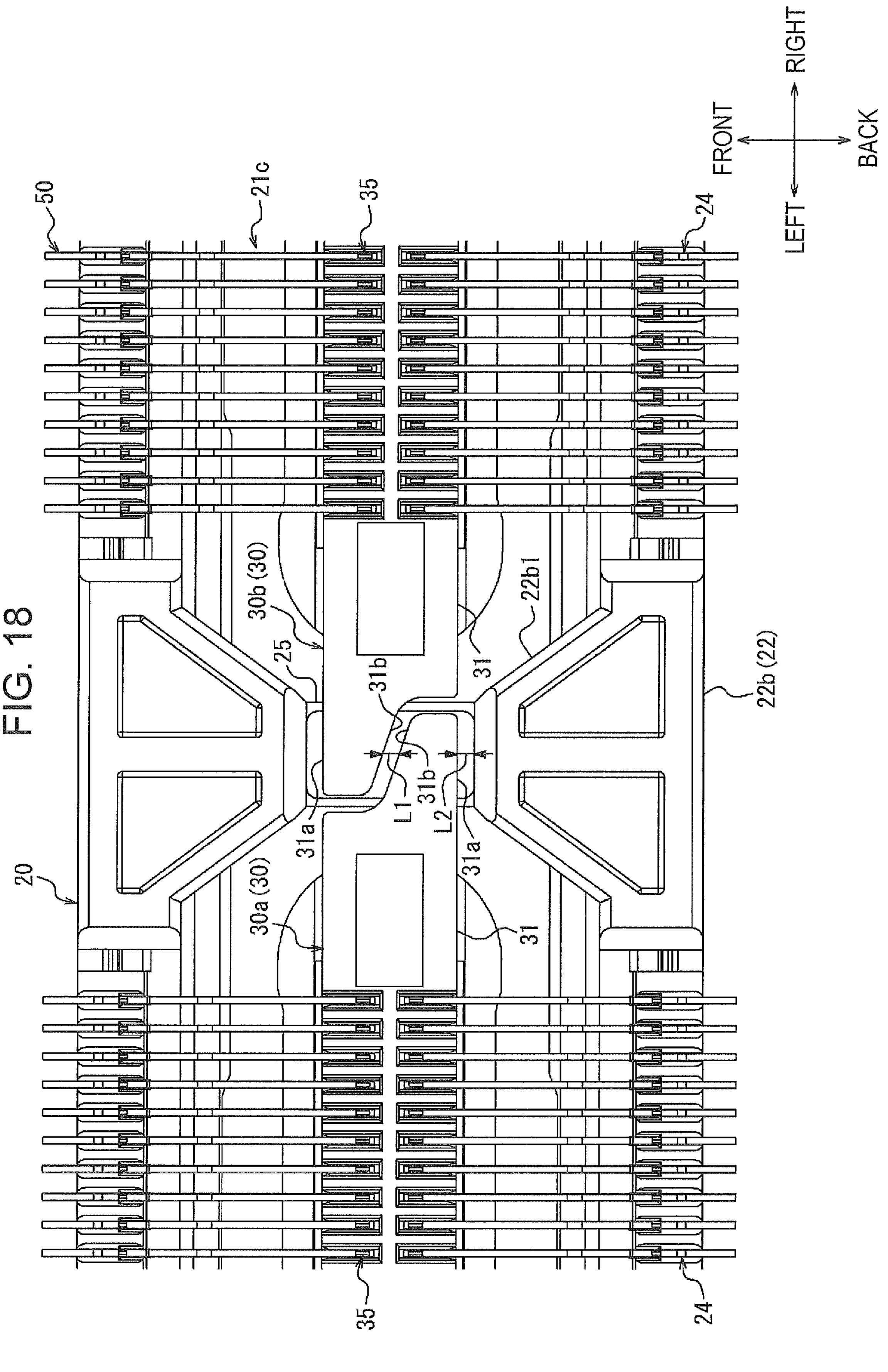
FIG. 18 is an enlarged view, corresponding to FIG. 5, of a second modification of the connector illustrated in FIG. 3.
Figure 19:
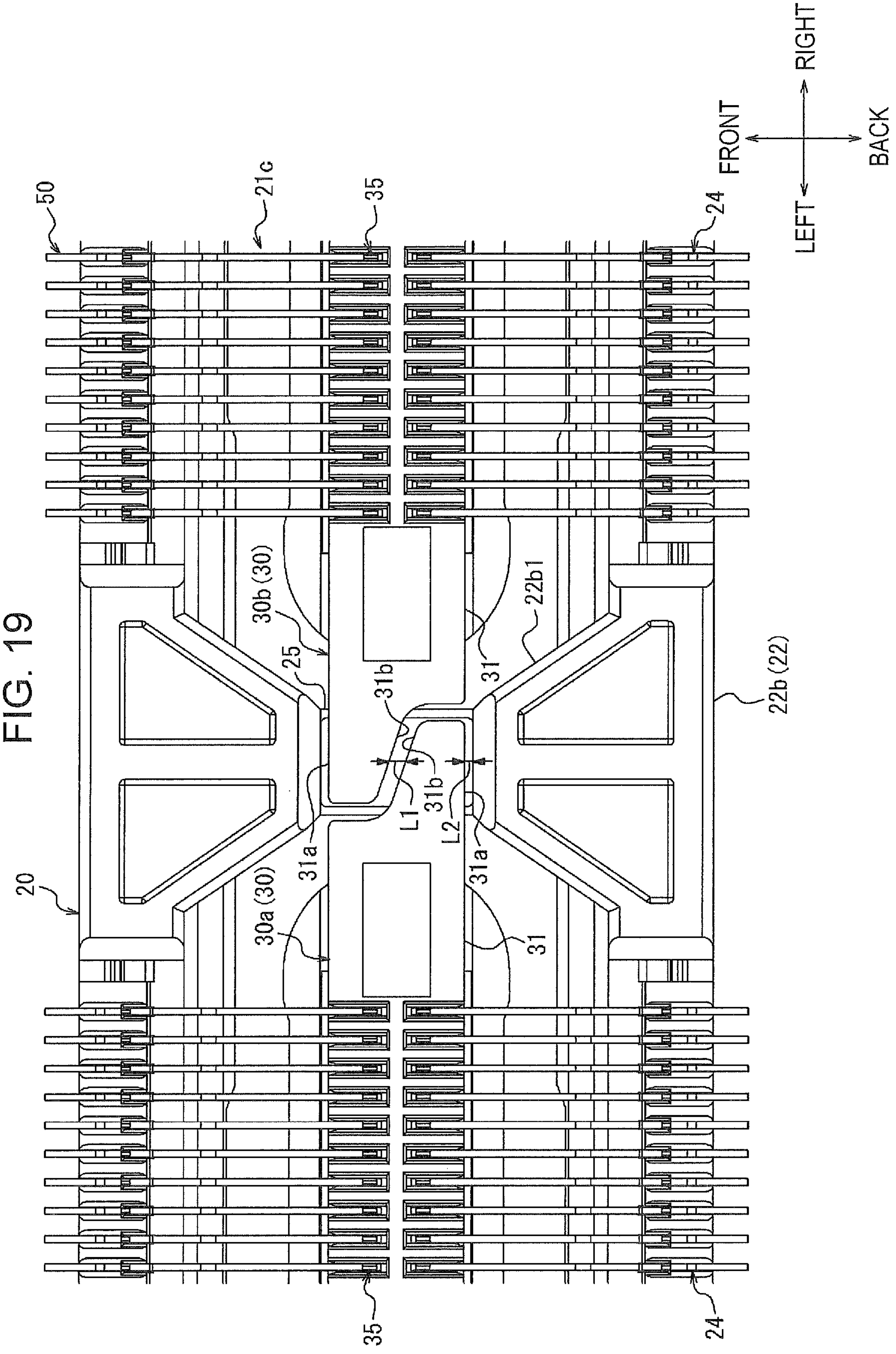
FIG. 19 is an enlarged view, corresponding to FIG. 5, of a third modification of the connector illustrated in FIG. 3.

FIG. 18 is an enlarged view, corresponding to FIG. 5, of a second modification of the connector 10 illustrated in FIG. 3. FIG. 19 is an enlarged view, corresponding to FIG. 5, of a third modification of the connector 10 illustrated in FIG. 3. It has been described above that the separation L1, which is the distance between two opposing surfaces 31*b* in the front-back direction, is smaller than the separation L2, which is the distance between the protrusion 31*a* and the protruding wall 22*b*1 of the fixed insulator 20. Although it has been described above that the amount of possible movement of the movable insulator 30 is greater than the separation L1 between two opposing surfaces 31*b* in the front-back direction, this is not intended to be limiting. In one example, as illustrated in FIG. 18, the separation L1 between two opposing surfaces 31*b* in the front-back direction may be equal to the separation L2 between the protrusion 31*a* and the protruding wall 22*b*1 of the fixed insulator 20. In another example, as illustrated in FIG. 19, the separation L1 between two opposing surfaces 31*b* in the front-back direction may be larger than the separation L2 between the protrusion 31*a* and the protruding wall 22*b*1 of the fixed insulator 20.

Although it has been described above that the first wide portion 51*a* and the second wide portion 55 are respectively provided along the fixed insulator 20 and the movable insulator 30, this is not intended to be limiting. As long as the transmission characteristics of the connector 10 are maintained, it suffices that the corresponding wide portion be provided along at least one of the fixed insulator 20 and the movable insulator 30.

It has been described above that, in the intermediate portion 54*b*, electrical conductivity improves as the characteristic impedance decreases due to the increased width of the transmission path, that is, the increased cross-sectional area of the transmission path. However, the configuration of the intermediate portion 54*b* for improving electrical conductivity is not limited to the above-mentioned configuration. The intermediate portion 54*b* may have any configuration for improving electrical conductivity. For example, the intermediate portion 54*b* may be made thicker than the first elastic portion 54*a* while maintaining the same width. For example, the intermediate portion 54*b* may be made of a material with a higher electrical conductivity than the first elastic portion 54*a* while maintaining the same cross-sectional area. For example, the intermediate portion 54*b* may have a coat of plating on its surface for improving electrical conductivity while maintaining the same cross-sectional area as that of the first elastic portion 54*a*.

It has been described above that, in the intermediate portion 54*b*, the first adjustment portion 54*b*1, the second adjustment portion 54*b*2, and the third adjustment portion 54*b*3 are varied in cross-sectional area in this order from the mating side to allow for adjustment of electrical conductivity. However, the configuration of the intermediate portion 54*b* is not limited to this configuration. Alternatively, the intermediate portion 54*b* may have any desired configuration that includes a structural portion with high electrical conductivity, a structural portion with low electrical conductivity, and a structural portion with high electrical conductivity in this order from the mating side. For example, the intermediate portion 54*b* may be varied in at least one of width, thickness, cross-sectional area, material, and the kind of plating to allow for adjustment of electrical conductivity.

It has been described above that, when the first elastic portion 54*a* and the second elastic portion 54*c* are not undergoing elastic deformation, the intermediate portion 54*b* extends in the direction of mating with the connection object 60, and that the first elastic portion 54*a* and the second elastic portion 54*c* extend from opposite ends of the intermediate portion 54*b* in the mating direction. However, this is not intended to be limiting. The first elastic portion 54*a*, the intermediate portion 54*b*, and the second elastic portion 54*c* may as a whole have any shape that allows the movable insulator 30 to move by a required amount. For example, the intermediate portion 54*b* may extend in a direction that deviates from the mating direction. For example, the first elastic portion 54*a* and the second elastic portion 54*c* may extend from opposite ends of the intermediate portion 54*b* in the front-back direction illustrated in FIG. 9. For example, the first elastic portion 54*a* and the second elastic portion 54*c* may have any shape, and may each have a greater number of bent portions. For example, the first elastic portion 54*a*, the intermediate portion 54*b*, and the second elastic portion 54*c* may as a whole have a U-shape, rather than a crank shape.

Although it has been described above that the first elastic portion 54*a*, the intermediate portion 54*b*, and the second elastic portion 54*c* are arranged in this order in the mating direction from the mating side as illustrated in FIG. 10, this is not intended to be limiting. Alternatively, the first elastic portion 54*a*, the intermediate portion 54*b*, and the second elastic portion 54*c* may be arranged in this order from the opposite side, as long as such arrangement allows the movable insulator 30 to move by a required amount.

Although it has been described above that the first elastic portion 54*a* and the second elastic portion 54*c* are narrower than the base 51, this is not intended to be limiting. The first elastic portion 54*a* and the second elastic portion 54*c* may have any configuration that allows for required amount of elastic deformation. For example, the first elastic portion 54*a* or the second elastic portion 54*c* may be made of a metallic material with a smaller elastic modulus than other parts of the contact 50.

The connector 10 may not have the second elastic portion 54*c* and the third elastic portion 56, as long as the movable insulator 30 is allowed to move by a required amount.

Although it has been described above that the wall 36 extends inside the movable insulator 30 downward from the bottom surface of the mating recess 33, this is not intended to be limiting. As long as the wall 36 is able to prevent or reduce contact between a pair of contacts 50, the wall 36 may be provided, for example, only at a location where the wall 36 faces the second wide portion 55.

The connector 10 may not have the notch 57, as long as the third elastic portion 56 is able to, with the third locking portion 58 in secure locking engagement and the elastic contacting portion 59 in secure contact, contribute to movement of the movable insulator 30.

Although it has been described above that the contact 50 is made of a metallic material with a small elastic modulus, this is not intended to be limiting. The contact 50 may be made of a metallic material with any desired elastic modulus that allows for required amount of elastic deformation.

Although it has been described above that the contact 50 has the projecting and recessed portion 51*b* including a projection and a recess, this is not intended to be limiting. Alternatively, the contact 50 may have only a projection, rather than the projecting and recessed portion 51*b*.

Although it has been described above that the connection object 60 is a plug connector to be connected to the circuit board CB2, this is not intended to be limiting. The connection object 60 may be any object other than a connector. For example, the connection object 60 may be an FPC, a flexible flat cable, a rigid board, or the card edge of any circuit board.

The connector 10 described above is mounted to an electronic apparatus. Exemplary electronic apparatuses include any vehicle-installed apparatus such as a camera, a radar, a drive recorder, or an engine control unit. Exemplary electronic apparatuses include any vehicle-installed apparatus used in a vehicle-installed system such as a GPS navigation system, an advanced driver-assistance system, or a security system. Exemplary electronic apparatuses include any information apparatus such as a personal computer, a copy machine, a printer, a facsimile, or a multifunction machine. Other exemplary electronic apparatuses include any industrial apparatus.

For the electronic apparatus described above, the connector 10 having a floating structure is capable of mitigating the load exerted on the movable insulator 30 that is in mating engagement with the connection object 60. Such electronic apparatus has improved signal transmission characteristics. Further, the improved floating structure of the connector 10 helps to absorb misalignment between the circuit boards. This facilitates assembly of the electronic apparatus. Manufacture of the electronic apparatus is thus facilitated. The connector 10 helps to prevent or reduce damage at the location of connection with the circuit board CB1. This leads to improved reliability of the electronic apparatus as a product.

REFERENCE SIGNS LIST

10 connector
20 fixed insulator
21*a* first opening
21*b* second opening
21*c* third opening
22 outer periphery wall
22*a* lateral wall
22*b* longitudinal wall
22*b*1 protruding wall
23 metal-fitting attachment groove
24 contact attachment groove
25 division wall
26 boss
30 movable insulator
30*a* first movable insulator
30*b* second movable insulator
31 bottom portion
31*a* protrusion (first protrusion, second protrusion)
31*b* opposing surface
32 mating projection
33 mating recess
34 guide portion
35 contact attachment groove
36 wall
37 recess
38 projection
40 metal fitting
41 mounting portion
42 coupling portion
43 retaining portion
44 locking portion
50, 50*a*, 50*b* contact
51 base
51*a* first wide portion
51*b* projecting and recessed portion
52*a* first locking portion
52*b* second locking portion
53 mounting portion
54*a* first elastic portion
54*b* intermediate portion
54*b*1 first adjustment portion
54*b*2 second adjustment portion
54*b*3 third adjustment portion
54*c* second elastic portion
55 second wide portion
56 third elastic portion
57 notch
58 third locking portion

59 elastic contacting portion
60 connection object
70 insulator
71 first mating recess
72 second mating recess
73 first mating projection
74 second mating projection
75 guide portion
76 metal-fitting attachment groove
77 contact attachment groove
80 metal fitting
81 mounting portion
82 locking portion
90 contact
91 mounting portion
92 contacting portion
CB1, CB2 circuit board
L1, L2 separation

The invention claimed is:

1. A connector comprising:

a fixed insulator in a shape of a frame, the fixed insulator comprising a division wall;

a movable insulator that is disposed inside the fixed insulator, capable of moving relative to the fixed insulator, and mates with a connection object, the connection object being an object to be connected; and a plurality of contacts attached to the fixed insulator and the movable insulator, wherein the movable insulator includes a first movable insulator and a second movable insulator, the first movable insulator and the second movable insulator being disposed inside the fixed insulator while being separated from each other by the division wall, the first movable insulator and the second movable insulator being capable of moving independently of each other.

2. The connector according to claim 1, comprising a metal fitting attached to the fixed insulator, wherein the first movable insulator has a first protrusion that protrudes from a side of the first movable insulator, wherein the second movable insulator has a second protrusion, the second protrusion being spaced apart from the first protrusion and protruding from a side of the second movable insulator, and wherein at least one of the fixed insulator and the metal fitting overlaps the first protrusion and the second protrusion from a mating side from which the connection object is mated to the movable insulator.

3. The connector according to claim 2, wherein the division wall overlaps the first protrusion and the second protrusion from the mating side.

4. The connector according to claim 2, wherein a distal end of the first protrusion is positioned further toward the second movable insulator relative to a distal end of the second protrusion.

5. The connector according to claim 1, wherein the first movable insulator and the second movable insulator are disposed linearly in a direction of arrangement of the contacts.

6. The connector according to claim 1, wherein the first movable insulator and the second movable insulator are identical to each other in shape.

7. The connector according to claim 1, wherein the first movable insulator and the second movable insulator are different from each other in shape.

8. The connector according to claim 7, wherein the first movable insulator and the second movable insulator are different from each other in length in a mating direction, the mating direction being a direction of mating between the connection object and the movable insulator.

9. An electronic apparatus comprising the connector according to claim 1.

10. The connector according to claim 1, wherein the divisional wall is positioned in the fixed insulator between the first movable insulator and the second movable insulator.

11. The connector according to claim 1, wherein the fixed insulator comprises a pair of longitudinal walls and the divisional wall is connected to each of the pair of longitudinal walls.

12. The connector according to claim 1, wherein each of the first and the second movable insulators is surrounded by the fixed insulator.

* * * * *